US012637998B2

(12) United States Patent
Wall

(10) Patent No.: US 12,637,998 B2
(45) Date of Patent: May 26, 2026

(54) LATCHING FULL-LENGTH HOLLOW SHAFT WAVE ENERGY CONVERTER FOR SCALABLE CONVERSION AND STORAGE

(71) Applicant: Brian Wall, Glengarriff (IE)

(72) Inventor: Brian Wall, Glengarriff (IE)

( * ) Notice: Subject to any disclaimer, the term of this patent is extended or adjusted under 35 U.S.C. 154(b) by 59 days.

(21) Appl. No.: 18/707,829

(22) PCT Filed: Nov. 12, 2022

(86) PCT No.: PCT/IE2022/050003
§ 371 (c)(1),
(2) Date: May 6, 2024

(87) PCT Pub. No.: WO2023/084506
PCT Pub. Date: May 19, 2023

(65) Prior Publication Data

US 2025/0369416 A1 Dec. 4, 2025

(30) Foreign Application Priority Data

Nov. 13, 2021 (IE) .................................... 2021/0189

(51) Int. Cl.
*F03B 13/18* (2006.01)

(52) U.S. Cl.
CPC .................................... *F03B 13/18* (2013.01)

(58) Field of Classification Search
CPC ....................................................... F03B 13/18
See application file for complete search history.

(56) References Cited

U.S. PATENT DOCUMENTS

| | | | | |
|---|---|---|---|---|
| 4,076,463 A * | 2/1978 | Welczer | F04B 1/02 60/497 |
| 9,234,493 B2 * | 1/2016 | Lo | F03B 13/16 |
| 2010/0043425 A1 * | 2/2010 | Dragic | F03B 13/189 60/504 |
| 2011/0225964 A1 * | 9/2011 | Welch, Jr. | F03B 13/1875 60/497 |

FOREIGN PATENT DOCUMENTS

| | | | |
|---|---|---|---|
| IE | 86608 B1 * | 12/2015 | |
| IE | 20170151 A1 * | 5/2019 | |
| WO | WO-2020012453 A1 * | 1/2020 | F03B 13/187 |

* cited by examiner

*Primary Examiner* — Jesse S Bogue
(74) *Attorney, Agent, or Firm* — Mitchell Law PLLC; Matthew W. Mitchell

(57) ABSTRACT

The present invention relates to the use of marine devices for ocean energy extraction.
The invention provides for a wave energy converter that uses latching to control a buoyant moving component that comprises a float attached to a shaft with a piston that pressurises fluid in a compression chamber within a submerged floatation component.
According to the present invention, the shaft is a full-length hollow shaft that extends down through the compression chamber and is attached to a rotatable float with submerged vanes.

20 Claims, 14 Drawing Sheets

Figure 12
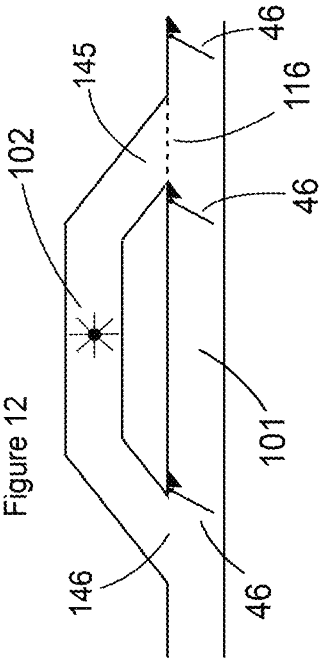
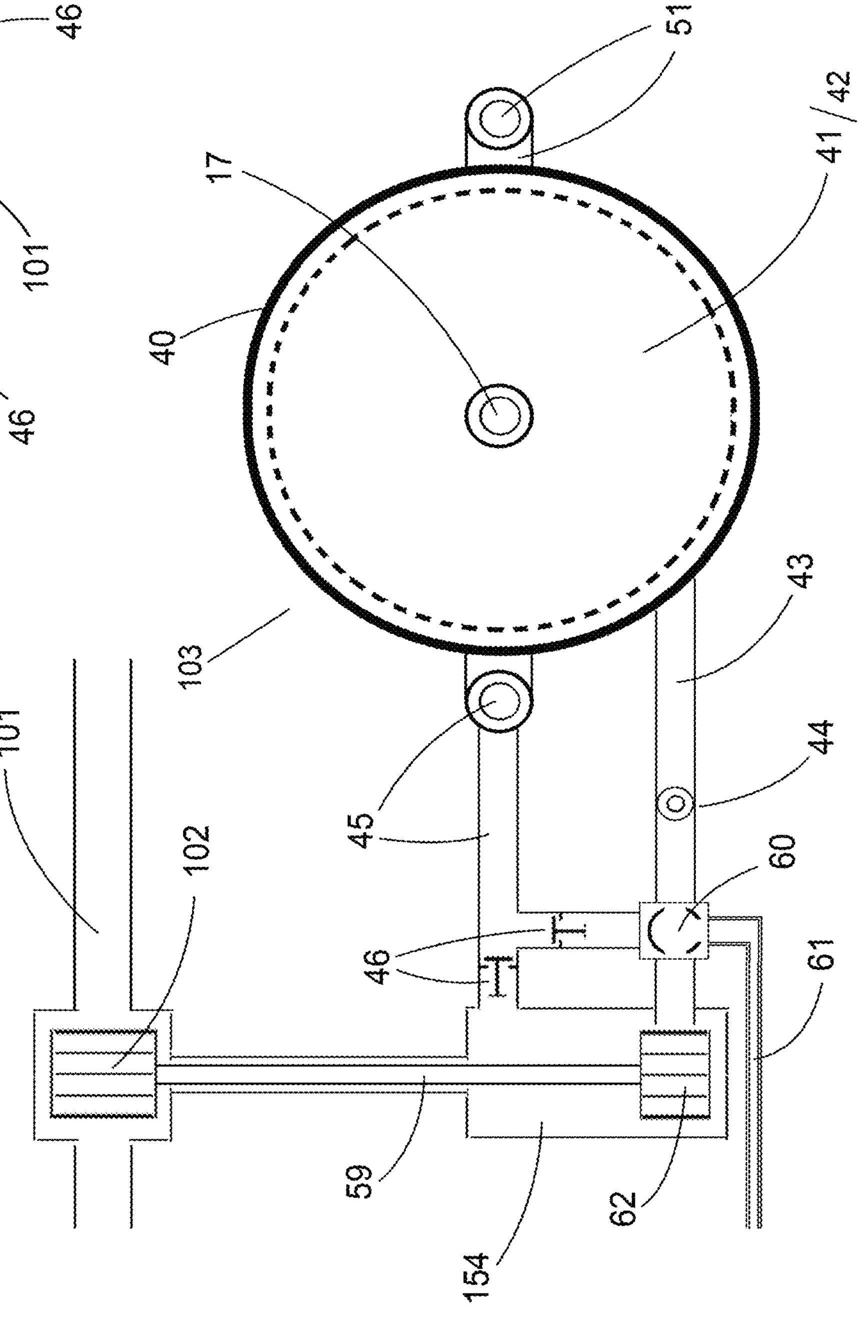
Figure 11

LATCHING FULL-LENGTH HOLLOW SHAFT WAVE ENERGY CONVERTER FOR SCALABLE CONVERSION AND STORAGE

FIELD OF INVENTION

The present invention relates to the use of devices to exploit the energy in ocean waves.

BACKGROUND TO THE INVENTION

Tackling climate change requires clean renewable sources of energy.

Waves carry large amounts of renewable energy across oceans in a steady manner. However, the sea is a difficult, dangerous, and expensive place in which to work. To successfully harness the energy in waves, a device must produce more power than it uses in manufacture, deployment, operation, maintenance, product delivery, and replacement. The sequential nature of waves hampers scaling up of devices to deliver more power. Today there are no commercial-level wave energy converters operating anywhere despite over a hundred years of scientific work.

Relevant disclosures in this field are described in:

US 2011/225964 A1 (WELCH JR KENNETH W [US] ET AL) 22 Sep. 2011

WO 98/20253 A1 (BERG JOHN L [US] 14 May 1998

US 542458 2A (JOHN A. TREPL) 1984 May 24

U.S. Pat. No. 4,076,463 A (WELCZER MORDECHAI) 28 Feb. 1978

US 2010/109329 A1 (BRANTINGHAM)

Applicant's own patent, IE 86 608 B1 (WALL, BRIAN (IE) 30 Dec. 2015 and patent application IPOI (2017/0151) disclose wave energy converters using a latching mechanism to maximise energy conversion.

Applicant's further patent application for a Wave-lock Marine Energy Converter, application number PCT/IE2019/000007, publication number WO2020/012453, improved on those designs by providing a simpler apparatus and a more efficient latching mechanism. However, it is desirable to further refine and improve upon the ideas introduced in these designs.

SUMMARY OF THE INVENTION

A latching single-point wave energy converter is a device that is configured to pause at the peaks and troughs of waves to capture the maximum gravitational potential energy available and that comprises the body of the apparatus, which is a buoyant floatation component, which during operation is held below the sea surface by moorings.

The floatation component contains a buoyancy chamber or hollow space into which fluids can be inserted and removed, apertures through which water is free to flow, and parts that transfer fluid, respond to fluid movement, and control the movement of fluid.

The floatation component supports a buoy, or buoyant moving component, that is free to move vertically relative to the floatation component. The buoy, or buoyant moving component, includes a float which provides buoyancy, and which is attached to a shaft or rod.

The shaft extends into the floatation component where it engages with a power take-off mechanism that is configured to latch, halt, or pause, the buoyant moving component at the crest and trough of each wave and to unlatch the buoyant moving component at the trough and crest of the next wave.

The shaft is free to move vertically within the power take-off mechanism, and where the power take-off mechanism is a cylindrical compressor chamber, the shaft acts as a piston rod and is configured to include a collar or cylindrical protrusion that serves as a piston.

The compressor chamber wall has apertures, or gaps, which sometimes correspond to apertures in a cylindrical latch sleeve that surrounds the compressor chamber, and that is free to rotate, and which is fluidly connected to one or more outlet pipes and to one or more inlet pipes held in place by a cylindrical compressor unit outer housing.

The latch sleeve supports vertical blades that extend from the outer surface of the latch sleeve to form partial barriers to water movement in a surrounding chamber.

The chamber is fluidly connected to the exterior of the floatation component via pipes, hoses or tubes on each side of the blades.

The latch sleeve is also connected to material that can be subjected to pressure and that can be raised against gravity to provide a restoring force.

In a restoring force chamber, blades that are also fixed to the outer side of the latch sleeve are separated by partitions and have the openings to fluid pipe loops in the roof of the chamber on either side of each blade, each fluid pipe loop having an air pocket trapped at the top of the loop.

A latching full-length hollow-shaft wave energy converter for scalable conversion and storage is a wave energy converter as described, it is characterised by additional features that comprise the following improvements.

The shaft is a full-length hollow shaft that extends from the top of the float out through the base of the power take-off mechanism.

The buoyant moving component is free to rotate relative to the floatation component.

The buoyant moving component is wider than the upper part of the floatation component and supports one or more barriers to water movement, such as vanes or blades, that extend sufficiently deep from the buoyant moving component to be always partly or fully submerged below the sea-surface.

The shaft is configured to be a tube or pipe containing a channel along its full length. The shaft has openings to the channel at both its upper and lower sections.

The shaft houses structures in the channel and is free to move independently of the structures with both vertical motion and with rotational motion.

The apparatus contains components that are shaped to exert an adjustable backpressure force against the force exerted by the buoyant moving component.

Where the power take-off mechanism is a compressor chamber and the compressor chamber is controlled by a surrounding latch sleeve, the latch sleeve is connected to materials, including compressible fluids, elastic materials, and suspended weights, that provide a restoring force in response to the rotation of the latch sleeve.

A storage mechanism that is fluidly connected to the compressor chamber is vented to the atmosphere via the shaft channel and can be fluidly connected to floating structures that provide deep water moorings for the apparatus.

The present invention provides important advantages: a simpler latching mechanism, efficient energy storage with pressurised fluid compressed against a stable backpressure, the capacity to scale-up energy conversion, and adjustable moorings to facilitate maintenance and closer deep-ocean operation for scaled-up devices.

In one embodiment the barriers to water movement that are supported by the buoy, or buoyant moving component, are orientation vanes, blades, or rudders that are aligned and extend deep enough to be always at least partly submerged below the water surface.

In one embodiment orientation vanes, or blades, are connected to a float frame or support structure that also supports the float. The float frame is fixed to the shaft, and is shaped for minimum wind-resistance, and maximum strength and extends farther than the outer edge of the floatation component, the body of the apparatus.

In one embodiment, the shaft is free to rotate around a shaft sleeve or inner tube, part of which is contained within the shaft channel, the shaft sleeve being supported outside the shaft channel by a flange fixed to the body of the floatation component.

In one embodiment the float is coupled to the shaft with a swivel connection or rotary linkage or rotating coupling that allows the float to swivel, rotate or pivot relative to the shaft.

In one embodiment, the apparatus includes parts that transfer, control, and respond to fluid, including ducts, valves, O-rings, seals, blades, weights, chambers, and expandible fluid containers.

In one embodiment one or more components of the apparatus are configured to exert an adjustable backpressure force against the force exerted by the buoyant moving component and include weights of different masses which are supported by expandible fluid containers into which fluid is pumped by the buoyant moving component.

In one embodiment expandible fluid containers that exert an adjustable backpressure force against the force exerted by the buoyant moving component are restrained by elastic or flexible material that can be adjusted to different degrees of tightness.

In one embodiment adjustable valves that exert an adjustable backpressure force against the force exerted by the buoyant moving component are adjusted to restrict the volume of fluid being pumped through them by the buoyant moving component.

In one embodiment adjustable power resistors that exert an adjustable backpressure force against the force exerted by the buoyant moving component can be set to oppose the flow of current in an electrical circuit generated by a generator driven by the buoyant moving component.

In one embodiment the vertical movement of the shaft drives one or more power take-off mechanisms that convert motion into useful actions, including compressors that compress fluid that is lighter than water, including air, to support floating marine structures fluidly connected to the apparatus.

In some embodiments a compressor chamber power take-off mechanism acts solely as the latching mechanism and the shaft engages with power take-off mechanisms that are located below the compressor chamber, including heaters, crushers, separators, mixers, sprayers, extractors, pile-drivers, drills, pumps and permanent magnet linear generators where the magnets are fixed to the shaft below the compressor chamber, and the movement of the shaft relative to the circuit formed by the windings that surround the shaft and magnets, generates power, the windings being housed in a container fixed to the structure of the floatation component.

In one embodiment, a shaft sleeve accommodates, or surrounds, fluid ducts, including pipes, tubes, or hoses that are housed, or accommodated, within the shaft channel, and contains gaps through which fluid ducts, including pipes, tubes, or hoses, can protrude.

In one embodiment, a shaft sleeve accommodates, or encompasses, fluid ducts, including pipes, tubes, or hoses, at the point of entry to the shaft channel above, adjacent, but not below the pipes, tubes, or hoses, so that the shaft sleeve can rise and fall in relation to the pipes, tubes, or hoses.

In one embodiment, the apparatus includes mechanisms that facilitate movement and minimise friction between components, including bearings and flanges, the shaft being in contact with a shaft sleeve via bearings and in contact with the structure of the floatation component via bearings. The shaft is also supported by a flange, that is in contact with the structure of the floatation component via bearings and is in contact with the shaft via bearings.

In one embodiment the shaft is free to rotate within the compressor chamber power take-off mechanism, and part of the shaft in the compressor chamber is configured to form a collar that acts as a piston which bears encircling structures that respond to pressure to restrict the movement of fluid, the structures include piston rings, and seals.

In one embodiment the buoy, or buoyant moving component, does not rotate relative to the body of the apparatus, or floatation component.

In one embodiment a compressor chamber power take-off mechanism is fluidly connected to high-pressure release valves via pipes and contains structures, that encircle the shaft to restrict the movement or escape of fluid and include O-rings and seals.

In one embodiment wherein a latch sleeve supports blades, or obstructions to water movement, that are configured to respond to water movement inside a latch control chamber, the latch sleeve also has apertures or gaps that are surrounded by seals and related components to restrict the movement or escape of fluid. The latch sleeve also has lateral grooves that encircle the outer surface of the latch sleeve above and below the latch control chamber, and above and below a restoring force adjuster chamber, the lateral grooves accommodating, solid, expandable rings that press against the inner surface of a compressor unit outer housing when compressed and include O-rings.

In different embodiments latch mechanisms use different means of latching or closing compressor chamber apertures including electronically controlled valves, shutters, or the vertical movement of a sleeve in response to varying water pressure.

In different embodiments latch mechanisms use different ways of responding to waves including, control floats and pistons that react to wave movement, sensors responding to differential pressure, and electronic sensors reading wave motion.

In different embodiments latch mechanisms can different restoring mechanisms to unlatch, or open, the valves in a compressor chamber.

In one embodiment a latch sleeve is connected to clastic materials including springs that connect the latch sleeve to immobile objects including the structure of the floatation component, the rotation of the latch sleeve extending the elastic materials.

In one embodiment a latch sleeve is connected to materials that can be shaped by pressure, including fluids that are compressed inside containers by pistons that are connected by piston rods and flexible joints to the latch sleeve. The containers are immobile and fixed to the structure of the floatation component and configured to allow the horizontal movement of the piston in response to the rotation of the latch sleeve.

In one embodiment a latch sleeve is mechanically connected to materials that are free to be raised against gravity by the rotation of the latch sleeve, including solid weights in the form of pendulums that are attached to the latch sleeve by means of a flexible joint connected to an arm, or lever, that is flexibly attached, or hinged, to the pendulums.

In another embodiment weights that are suspended from ropes are connected to the latch sleeve via pulleys that are fixed to immobile structures.

In another embodiment weights are attached to levers that are attached to the latch sleeve by means of flexible joints.

In another embodiment a latch sleeve is connected to water that is displaced by adjuster blades connected to a latch sleeve, the adjuster blades being in separate compartments inside a restoring force chamber, or adjuster chamber, that is fluidly connected to the exterior of the floatation component via adjuster chamber fluid supply pipes. Each compartment has pipe loops that are fluidly connected with the roof of the compartment and on either side of each adjuster blade. Each loop has an air pocket at the top of the loop. When the latch blades rotate the latch sleeve in one direction in response to water flow in a latch control chamber due to wave movement, water in the adjuster chamber compartments is pressurised by the consequent movement of the adjuster blades rotating in the same direction. This rotation of the adjuster blades causes water to rise higher against gravity on one side of each pipe loop and fall lower on the other side of each pipe loop.

However, when fluid pressure against the latch blades in the latch control chamber ceases sufficiently, gravity causes the high water level to fall on one side of the adjuster pipes loops and the resulting high water pressure on that side of the adjuster chamber pushes the adjuster blades on that side of the adjuster chamber back to a central position in the adjuster chamber; while on the other side of the pipe loop the low water level rises and low pressure on that side of the adjuster chamber pulls the blades also back into a central position until gravity has restored equilibrium and each blade is in the central orientation in each compartment.

In one embodiment the adjuster chamber is supplied with fluid via adjuster chamber fluid supply pipes that are fluidly connected to an internal fluid reservoir that is vented to the atmosphere via the shaft channel.

In one embodiment pipes housed in the shaft channel include latch chamber vent pipes that fluidly connect the atmosphere above the sea-surface to a latch chamber, the latch chamber also being fluidly connected to the exterior of the floatation component by one or more pipes that converge to form a single fluid connection to the exterior of the floatation component.

In one embodiment a latch control chamber is fluidly connected to the exterior of the floatation component by one or more latch pipes that converge to form a cluster of fluid connections, to the exterior of the floatation component.

In one embodiment pipes connected to a latch control chamber connect the latch control chamber to one or more fluid reservoirs that are vented to the atmosphere via the shaft channel.

In one embodiment a storage tank of the apparatus comprises a storage tank housing that houses an expandable container that contains fluid, the expandable container being free to expand against a resisting force.

In one embodiment a storage tank housing houses, or accommodates, a space with a low-pressure environment into which an expandible container is free to expand, the expandible container being fluidly connected via a storage tank housing to an inlet pipe, which is fluidly connected to a storage tank flexible inlet pipe, which is fluidly connected to a compressor chamber outlet pipe, which contains one-way valves, and which is fluidly connected to a compressor chamber, the expandable container also being fluidly connected via the storage tank housing to a storage tank outlet pipe, which is fitted with one-way valves.

In one embodiment a storage tank outlet pipe is fluidly connected to a high-pressure release valve, a diverter valve, and to a storage tank flexible outlet pipe.

In one embodiment a storage tank outlet pipe is fluidly connected via a storage tank diverter valve to an external delivery pipe, which is a pipe that is fluidly connected to other marine structures or to land-based structures.

In one embodiment a storage tank diverter valve is also connected to a storage tank communication pipe, which is a pipe that houses electrical cables, hydraulic pipes, or other means of communication, and through which the storage tank diverter valve can be controlled remotely.

In one embodiment an expandible container housed in a storage tank, that is fluidly connected to a floatation component compressor chamber, supports a resisting force in the form of a weight that is free to move vertically inside a part of the storage tank housing that contains fluid, which is fluidly connected, or vented, to a low-pressure environment.

In one embodiment a storage tank compartment that contains fluid is vented to the atmosphere via a rigid vent-pipe, a section of which is housed inside the shaft channel.

In one embodiment a storage tank rigid vent-pipe extends above the shaft channel and above the float, and supports at its highest point a cowl, or protective hood, which contains valves that allow the entry and the exit of air but prevent the entry of water.

In one embodiment a storage tank containing pressurised fluid that is lighter than water, such as air, is fluidly connected to a floating structure, or float, via a storage tank outlet pipe and via a pressure-reducing valve that restricts the flow of fluid into the floating structure when pressure reaches a set level, the floating structure having apertures that allow the movement of water in and out of the floating structure.

In one embodiment a storage tank outlet pipe is fluidly connected to a turbine, the turbine being housed inside a housing, which is fluidly connected to a surplus fluid outlet pipe, which contains one or more one-way valves, and which is fluidly connected to the atmosphere above the water surface via the shaft channel.

In one embodiment a turbine that is fluidly connected to a storage tank outlet pipe, is mechanically connected via a drive shaft to an electrical generator, which is electrically connected to a generator communication pipe, which is a pipe that contains communication mechanisms, including switches, pipes, and cables for the transmission of electricity and for the remote control of the electrical generator.

In one embodiment a turbine that is fluidly connected to a storage tank fluid outlet pipe is mechanically connected via a turbine drive shaft to an impeller that pumps fluid through a pipe.

In one embodiment a storage tank inside the floatation component is framed and supported by a storage tank float frame that is located around the sides of the storage tank, the storage tank float frame being a support structure that is fixed to, and supported by, the buoyancy of a storage tank float.

In one embodiment a storage tank is located outside the floatation component and fluidly connected to a storage tank outlet pipe that is fluidly connected via a diverter valve to a surplus fluid outlet pipe, which is a pipe that contains one-way valves and is fluidly connected via a flexible outlet pipe or hose to the surface of the sea.

In one embodiment a turbine that is fluidly connected to a storage tank outside the floatation component is connected via a drive shaft to an impeller that pumps fluid through a pipe to the floatation component, or to the sea surface, or through a seabed pipe.

In one embodiment a turbine, which is fluidly connected to a storage tank outlet pipe, is mechanically connected via a drive shaft to an impeller, which is located inside a branch of a seabed pipe that forms a loop, the loop forming a connection at one end to the seabed pipe by means of a three-way pipe connection with a filter at the point of the connection, and connecting at the other end to the seabed pipe by means of a three-way pipe connection located downstream from the first three-way connection. The seabed pipe contains one-way valves adjacent to the three-way connections.

In one embodiment a three-way pipe connection with a filter is connected to a seabed pipe and is also fluidly connected via a flexible pipe to a compressor chamber inlet pipe, while a second three-way connection fluidly connects the seabed pipe via a flexible pipe to a compressor chamber outlet pipe, the seabed pipe containing one-way valves adjacent to the three-way connections.

In one embodiment compressor chamber inlet and outlet pipes contain equipment for the desalination of water, including water pre-treatment units, concentrated brine sumps, concentrated brine removal pipes, reverse osmosis membrane units and post desalination treatment units, the outlet pipes being connected to a seabed pipe or to a storage tank via a storage tank flexible inlet pipe.

In one embodiment adapted for desalination, the floatation component contains equipment to produce hydrogen and oxygen from fresh water that is produced from desalinated water, and in another embodiment from fresh water supplied from outside the floatation component.

In one embodiment human access to the floatation component is via human access portals, chambers and apertures, including access via air-lock decompression access chambers that are located adjacent to permanent buoyancy compartments.

In one embodiment the buoyancy force of permanent buoyancy compartments in a floatation component is greater than the weight when floating in water of the floatation component while supporting the buoyant moving component and all external attachments other than moorings.

In one embodiment components and parts of the apparatus are configured to include fittings that allow disconnection and re-connection to other components, including pipes that can be disconnected, chambers that can be disassembled, and sleeves that can be removed.

In one embodiment mooring connections, which include ropes, cables, and chains, enter a floatation component via mooring connection channels and are secured to the floatation component inside mooring connection access chambers, which allow access to mooring connections from inside the floatation component.

In one embodiment a floatation component is moored by one or more mooring connections to moorings that are linked in sequence, or in other configurations, by mooring connections to one or more moorings, with the moorings that are connected directly to the floatation component being connected to one or more mooring floats, the mooring floats being submersible floats into which fluids can be injected and removed, the base of each mooring float having access apertures through which fluid is free to move, and each mooring float being shaped to contain enough air or fluid lighter than sea water to raise at least one mooring from the seabed.

In one embodiment mooring floats have hose connections to mooring float access buoys, through which fluid can be inserted or removed, the mooring float access buoys having enough permanent buoyancy to always remain at the surface.

In one embodiment one or more floatation components are moored by one or more mooring connections to a floating mooring platform that has base apertures through which water can move and fluid connections through which fluid can be inserted and removed, the floating mooring platform being moored by one or more mooring connections to moorings that are moored to other moorings, with the mooring that is directly connected to the floating mooring platform being also connected to one or more mooring floats that are fluidly connected to mooring float access buoys while the floating mooring platform is also fluidly connected to one or more mooring float access buoys.

In one embodiment the submerged body of the apparatus, or submerged floatation component, is supported by a structure resting on the seabed.

A BRIEF DESCRIPTION OF THE DRAWINGS

The sole purpose of reference numerals in the following pages is to make the description and claims easier to understand by referring to an element in one possible embodiment of the invention. The reference numerals are not included in the description or the claims to denote that an element of an embodiment that they refer to is the only possible embodiment of that element in the invention.

The invention will be more clearly understood from the following description of some embodiments of the invention, given by way of an example only, with reference to the following diagrammatic drawings.

FIG. 11 is a top view of one embodiment of the invention showing the Storage Tank (103) with a Turbine (62) and a Pump.

FIG. 12 is a cross-section, side-view of one embodiment of the invention when the Pump is adapted to transmit suspended solids in a Seabed Pipe (101).

A DETAILED DESCRIPTION OF THE DRAWINGS

FIG. 1

Shown in a cross-section side-view of one embodiment of the invention are the three main parts of the Apparatus (A) in relation to the Sea Surface (B), and Seabed (C): the body of the apparatus, the Floatation Component (1), which provides stable buoyancy and houses the wave energy conversion and latching components, the buoy of the apparatus, the Buoyant Moving Component (2), which rises and falls relative to the Floatation Component (1) to convert wave motion into useful products, and a Storage Tank (103).

The Floatation Component (1), is moored by mooring connections (7) to moorings (64), which are moored together in sequence, the first of which is physically connected to Mooring Floats (65), which are submersible floats that are fluidly connected to mooring Float Access Buoys (141), through which air can be pumped into the Mooring Floats (65) to displace water through an open aperture at the base of the Mooring Floats (65), so that the Mooring Floats (65) can rise and thereby raise one or more Moorings (64) from the Seabed (C) to raise the Floatation Component (1) to the sea surface (B) for access purposes.

A Floatation Component (1) supports a Buoyant Moving Component (2), which contains a Shaft (169—FIG. 2) which enables the Apparatus (A) to fluidly connect the atmosphere above the Sea Surface (B) with a Storage Tank (103) via a Rigid Vent-Pipe (10) and a Flexible Vent-Pipe (17) so that the vertical movement of the Buoyant Moving Component (2) will pump fluid into the Storage Tank (103) against atmospheric back-pressure only. The fluid from the Floatation Component (1) is transmitted via a Flexible Inlet Pipe (53) and a Storage Tank Inlet Pipe (51), to the Storage Tank (103).

Inside the Storage Tank (103) is an Expandable Container (41) that is free to expand into a Vent Fluid Compartment (39) which contains air that is vented to and from the atmosphere by a Rigid Vent-Pipe (10) and a Flexible Vent-Pipe (17).

An Expandable Container (41) holds fluid and supports a Weight (42) that rises and falls as fluid enters and exits the Expandable Container (41) providing a backpressure that limits the movement of the Buoyant Moving Component (2). The backpressure from the Weight (42) also ensures a more consistent output-pressure from the Storage Tank (103).

Figure 2:
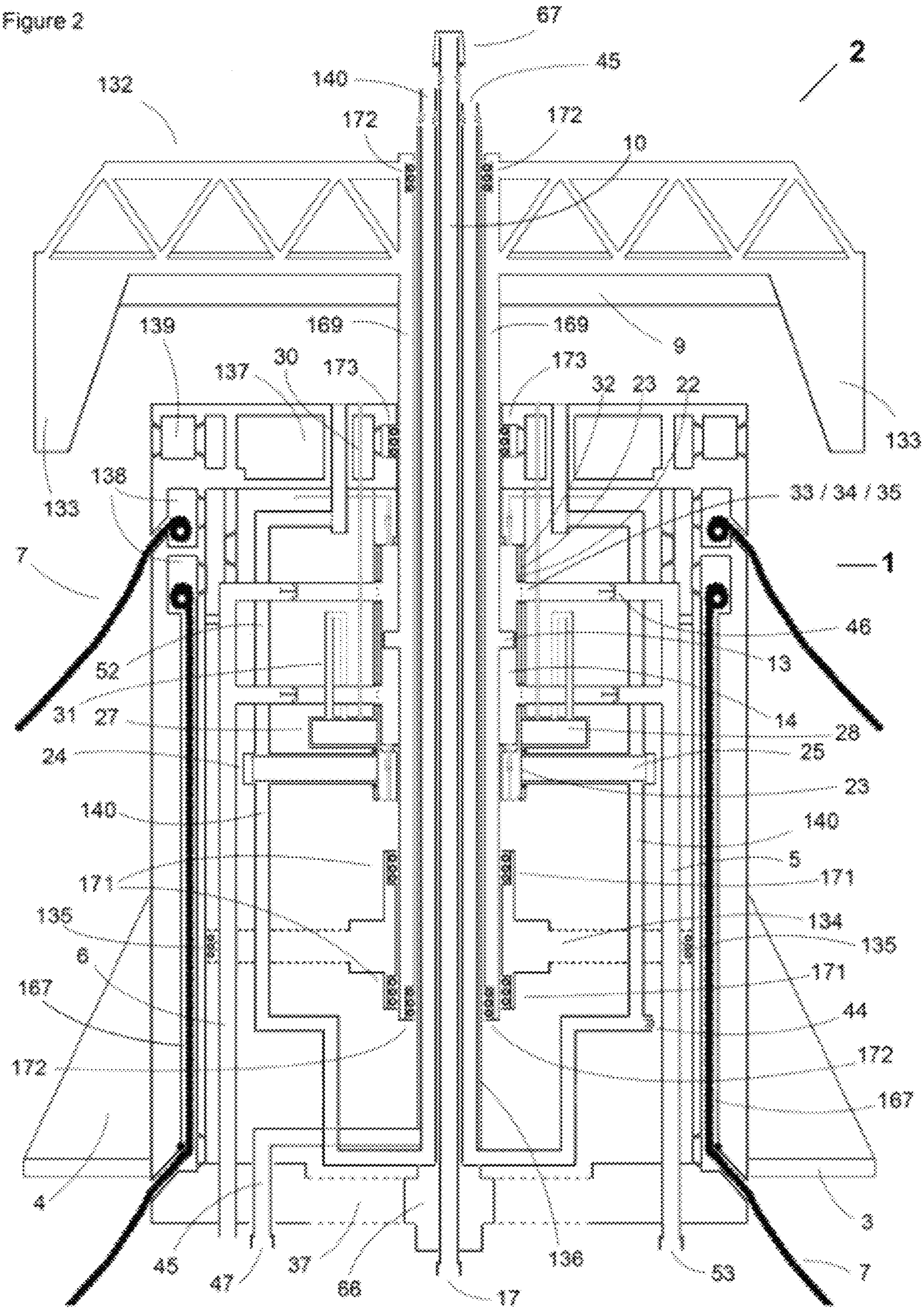
FIG. 2 is a cross-section, side-view of the same embodiment of the invention showing the internal structure of the body of the apparatus, the Floatation Component (1), and the Buoy of the apparatus, or Buoyant Moving Component (2).

Surplus fluid, or down-stream fluid from a Turbine (62), is released back to the surface against atmospheric pressure via a Flexible Outlet Pipe (47) and the Full-Length Hollow Shaft (169—FIG. 2).

FIG. 2

Shown in a cross-section, side-view from the same embodiment of the invention is the interior of a) the Floatation Component (1) and b) the Buoyant Moving Component (2). Forming part of the Buoyant Moving Component (2) is the Float (9), which provides the buoyancy for the Buoyant Moving Component (2) to rise to the water surface from below, while sufficiently heavy to descend to the water surface from above.

Attached to the Float (9) is a Shaft (169), a middle section of which forms a Piston (13) which rises and falls inside a Compressor Chamber power take-off mechanism (14).

As the Buoyant Moving Component (2) rises and falls fluid is drawn into the Compressor Chamber (14) through Compressor Chamber Inlet Pipes (6) that contain One-Way Valves (46), and fluid is pumped out of the Compressor Chamber (14) through Compressor Chamber Outlet Pipes (5) that contain One-Way Valves (46) and High-Pressure Release Valves (44).

The Compressor Chamber Inlet Pipes (6) and the Compressor Chamber Outlet Pipes (5) are attached to a Compressor Unit Outer Housing (32), which surrounds a Latch Sleeve (23), which surrounds the Compressor Chamber Wall (22) that forms the exterior of the Compressor Chamber (14).

The Latch Sleeve (23) is attached to Latch Control Blades (25), which are housed in a Latch Chamber (24), and which extend horizontally from the Latch Sleeve (23) to provide a partial barrier to water movement inside the Latch Control Chamber (24). The Latch Control Blades (25) respond to the alternating movement of water through the Latch Control Chamber (24) as the water flows to and from Latch Pipes (52) and Latch Chamber Vent Pipes (140) in response to the rise and fall of the sea surface with each wave.

Figure 5:
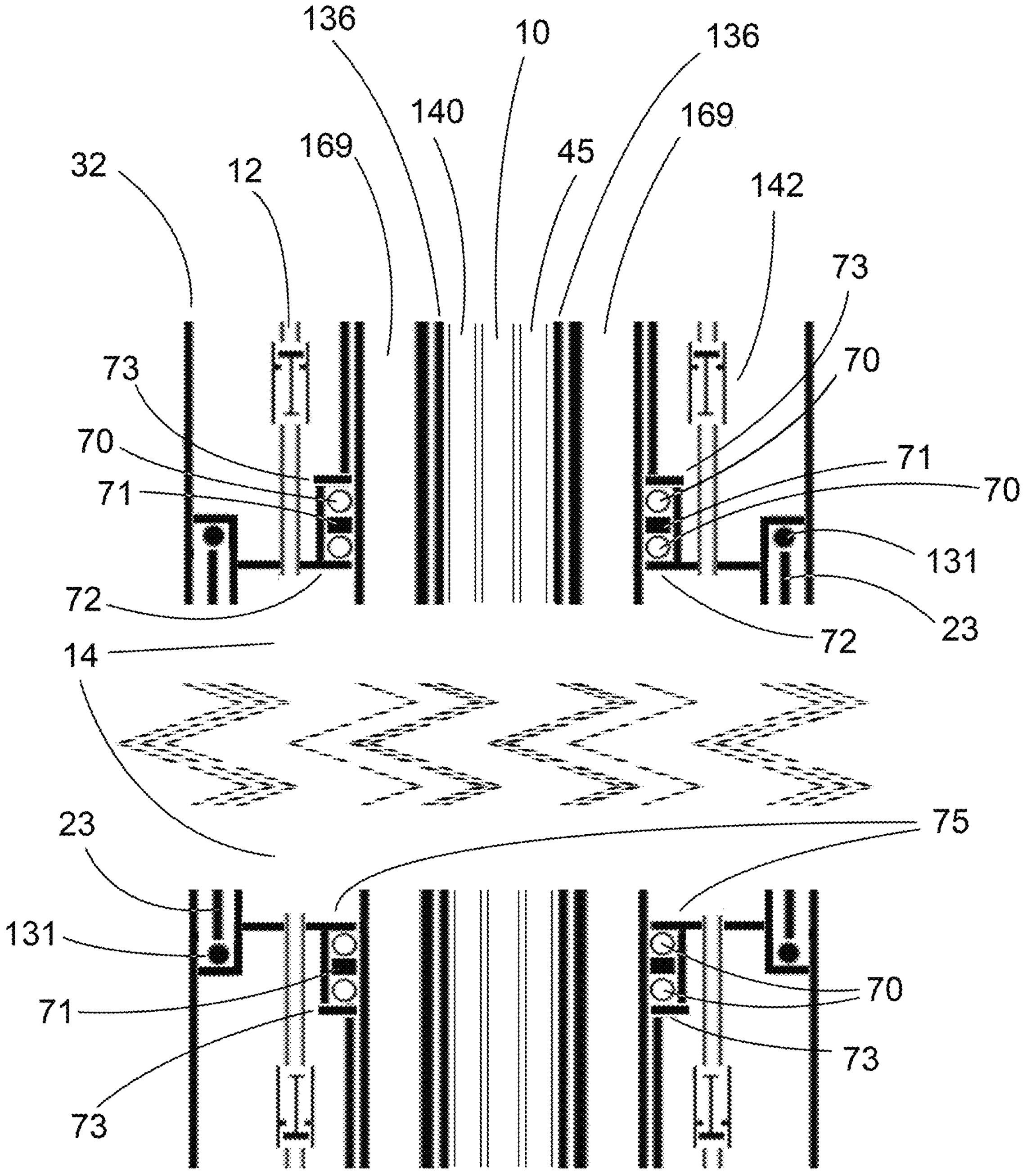
FIG. 5 is a cross section, side view of the same embodiment of the invention showing Compressor Chamber O-ring Seals, Compressor Chamber High-pressure Release Valves (44), and Latch Sleeve bearings.

The Latch Chamber Vent Pipes (140) are partly housed inside a Shaft Sleeve (136—FIG. 3 & FIG. 5), a section of which is housed inside a Shaft Channel (170) within the Shaft (169). The Latch Pipes (52) converge to form a single connection, or a cluster of connections, directly to the exterior of the Floatation Component (1).

The Latch Chamber Vent Pipes (140) are open at the top to allow water to travel back and forth through the Latch Chamber (24) and through the Latch Pipes (52) in response to variations in water pressure above the Floatation Component (1) caused by the waves.

The alternating movement of water through the Latch Control Chamber (24) deflects the Latch Control Blades (25) either clockwise or anti-clockwise and rotates the Latch Sleeve (23) either clockwise or anti-clockwise and closes the fluid connections to the Compressor Chamber (14) by moving Latch Sleeve Apertures (34) out of alignment with Compressor Unit Outer Housing Apertures (35), which are apertures in the Compressor Unit Outer Housing (32), and also out of alignment with Compressor Chamber Apertures (33), which are apertures in the Compressor Chamber Wall (22). The non-alignment of the Latch Sleeve Apertures (34) with the Compressor Chamber Apertures (33) and the Compressor Unit Outer Housing Apertures (35), traps fluid inside the Compressor Chamber (14), halting the movement of the Buoyant Moving Component (2) for as long as water is flowing in either direction through the Latch Control Chamber (24).

However, once the movement of the sea surface has halted at the crest or trough of a wave, and water has stopped flowing through the Latch Chamber (24), a restoring force is provided by an Adjuster Chamber (27) that is supplied with water from outside the Floatation Component (1) by Adjuster Chamber Fluid Supply Pipes (30).

The Adjuster Chamber (27) houses Adjuster Blades (28), which are separated by partitions. The Adjuster Blades (28) are attached to the Latch Sleeve (23) so that the rotation of the Latch Control Blades (25) also rotates the Adjuster Blades (28).

The deflection of the Latch Sleeve (23) away from a neutral orientation deflects the Adjuster Blades (28) away from a neutral orientation. This causes water in the Adjuster Chamber (27) to be forced by the movement of the Adjuster Blades (28) into an uneven distribution in Adjuster Pipe Loops (31).

The Adjuster Pipe Loops (31) are single lengths of pipe that are configured to form a loop, with each the end of an Adjuster Pipe Loop (31) being fluidly connected to the roof of the Adjuster Chamber (27) on either side of each Adjuster Blade (28). The Adjuster Pipe Loops (31) contain water and air, the air forming an air pocket at the highest point, so that the deflection of the Adjuster Blades (28) away from a neutral orientation causes water on one side of each Adjuster Pipe Loop (31) to be higher than on the other.

When the movement of the sea surface has ceased at the crest or trough of a wave, the flow of fluid, which has deflected the Latch Control Blades (25), also ceases so that gravity can now restore the fluid balance in the Adjuster Pipe Loops (31).

The consequent movement of fluid through the Adjuster Chamber (27) impinges upon the Adjuster Blades (28), rotating them back into a neutral position. This rotation of the Adjuster Blades (28) rotates the Latch Sleeve (23) back into a central orientation, which re-aligns the Compressor Chamber Apertures (33), the Latch Sleeve Apertures (34), and the Compressor Unit Outer Housing Apertures (35). This realignment allows the release of the trapped fluid from the Compressor Chamber (14) and allows the Buoyant Moving Component (2) to rise or fall, and to continue to move for as long as the force of water flowing in either direction through the Latch Control Chamber (24) is not greater than the force of water flowing in and out of the Compressor Chamber (14), thereby allowing the Buoyant Moving Component (2) to ascend or descend and cause the Piston (13) to pump water in and out of the Compressor Chamber (14).

Consequently, the Buoyant Moving Component (2) only rises from the level of the last wave trough when the sea surface has halted at the next wave crest and can only fall from the level of the last wave crest when the sea surface has halted at the next wave trough and when the Buoyant Moving Component (2) does ascend or descend, it delivers the maximum gravitational energy available from each wave.

The energy captured from each wave can be increased because the Float (9) can be scaled up to be longer than the distance between waves and can have greater mass and volume and can therefore travel with greater force and deliver more energy.

This is possible because the hollow Shaft (169) is free to rotate around the Shaft Sleeve (136), which is held rigidly in place by a Vent Pipe Flange (66).

The movement of the Shaft (169) is facilitated by Shaft Inner Bearings (172), which are the contact points between the Shaft (169) and the Shaft Sleeve (136).

The movement of the Shaft (169) is also facilitated by Shaft Support Flange Inner Bearings (171), which are the contact points between the exterior of the Shaft (169) and a Shaft Support Flange (134), which is a flange supporting the Shaft (169) and is in contact with the structure of the Floatation Component (1) via Shaft Flange Bearings (135).

Also facilitating the movement of the Shaft (169) are the Floatation Component Bearings (173), which are the contact points between the Shaft (169) and the Floatation Component (1).

Though the Shaft (169) is free to rotate, thereby allowing the Float (9) to be longer than the wavelength of the waves, the Float (9) must remain parallel to the wavefront.

To keep the Float (9) parallel to the wave front a Float Frame (132), which provides support for a longer Float (9), also provides support for Orientation Blades (133), which are vanes that act as barriers to the movement of the water molecules in each wave.

The Orientation Blades (133) extend down deep enough from the base of the Float (9) to be always partly submerged below the water and always subject to water movement.

To provide storage of captured energy at sea the Shaft Sleeve (136), inside the Shaft Channel (170) within the Shaft (169), can house fluid ducts, including vent pipes.

The Rigid Vent-Pipe (10) housed inside the Shaft Sleeve (136) vents fluid from a Storage Tank (103—FIG. 1), thereby enabling the Buoyant Moving Component (2) to pump fluid into a Storage Tank (103) via a Flexible Inlet Pipe (53) against atmospheric pressure only, regardless of the depth at which the Storage Tank (103) is located.

A Flexible Vent-Pipe (17) connects a Storage Tank (103) with the Rigid Vent-Pipe (10), which supports a Vent Pipe Cowl (67) that contains valves that allow the entrance and exit of air but prevents the entrance of water.

A Surplus Fluid Outlet Pipe (45) is also partly housed in the Shaft (169) and transfers surplus fluid to sea-level from a Storage Tank (103) via a Flexible Outlet Pipe (47) to prevent any obstruction to the movement of the Buoyant Moving Component (2) when a Storage Tank (103) reaches full capacity.

Because the apparatus can be scaled up to maximise energy capture, Moorings (64) and Mooring connections (7) are adapted to maintain stability.

Easier access to Mooring Connections (7) is provided by locating their connections to the Floatation Component (1) in Mooring Connection Access Chambers (138).

Figure 15:
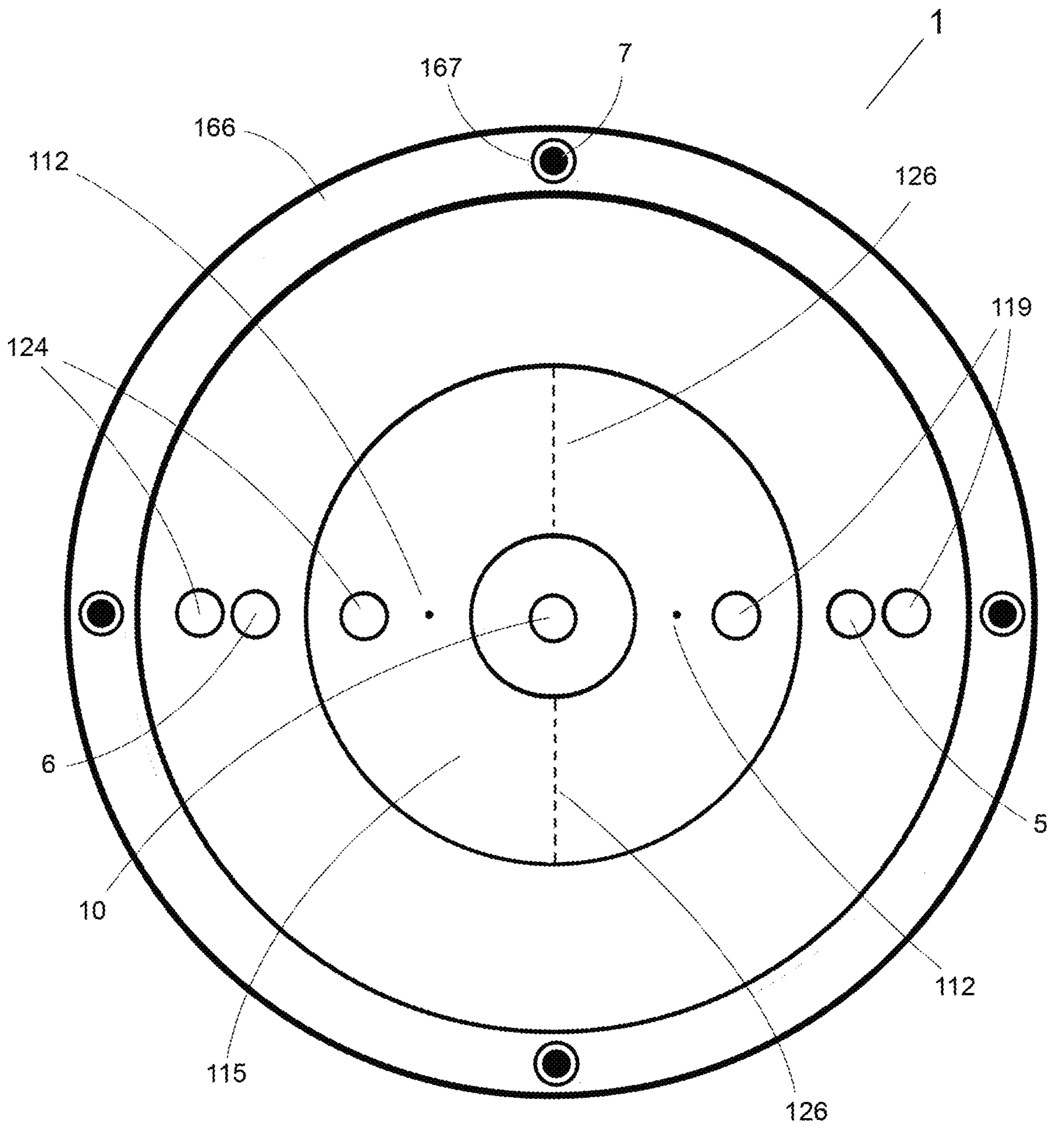
FIG. 15 shows a cross-section, top view of the same embodiment from above the roof of the Electrolysis Tank (115) and below the horizontal sections of the Hydrogen Outlet Pipe (119) and the Oxygen Outlet Pipe (124).
Figure 16:
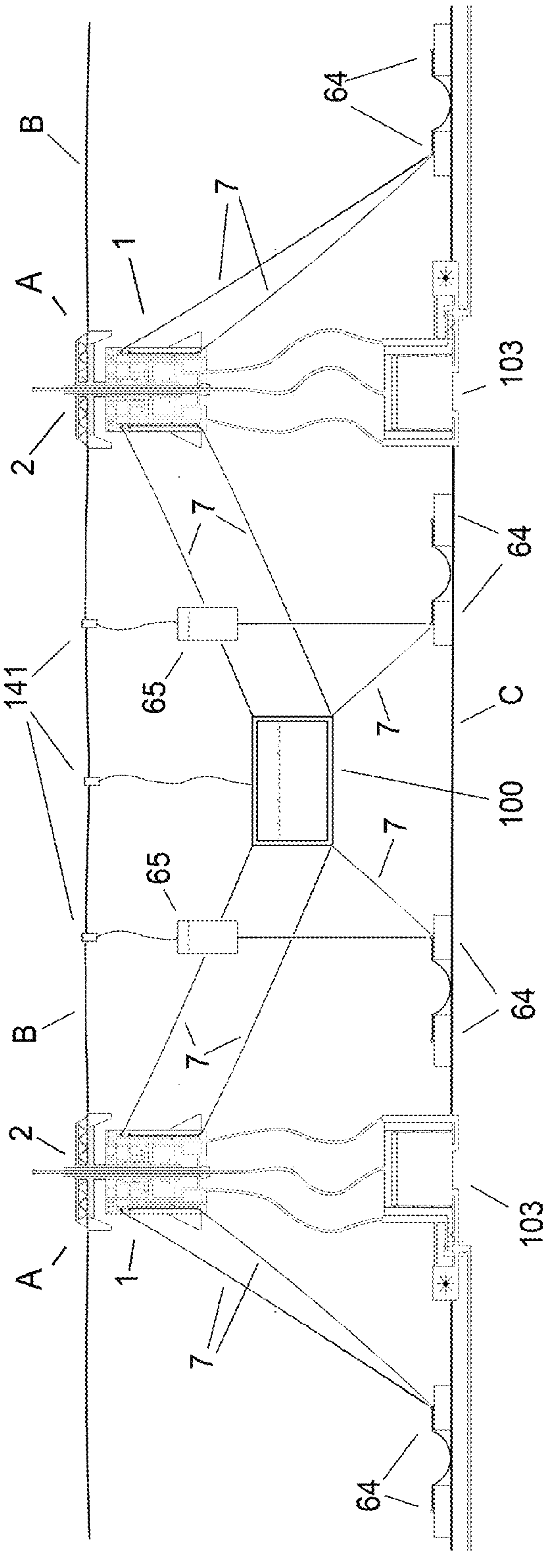
FIG. 16 shows a cross-section, side-view of one embodiment of the invention showing the moorings adapted for deep water operation.

The Mooring Connections (7) enter the Mooring Connection Access Chambers (138) via Mooring Connection Channels (167—top-down viewpoint in FIG. 15).

Access for maintenance personnel to the interior of the Floatation Component (1) is provided via Air-Lock Access Chambers (139), which are located adjacent to Permanent Buoyancy Compartments (137).

Also shown is the Stability Plate (3) the Stability Fins (4) and the Access Aperture (37), which provides for the pressure within the Floatation Component (1) to remain equalised with the pressure outside the Floatation Component (1).

FIG. 3

Shown in an external, top view from the same embodiment of the invention from above the Float (9) but below the Vent Pipe Cowl (67), are the Mooring Connections (7), the Stability Fins (4), the Stability Plate (3), and the Shaft (169), which connects the Float (9) with the Floatation Component (1).

Surrounded by, but not connected to the Shaft (169) is the Shaft Sleeve (136), which is contained inside a Shaft Channel (170), which is a hollow channel inside the Shaft (169).

The Shaft Sleeve (136) remains static and around it the Shaft (169) is free to move vertically and to rotate. The Shaft Sleeve (136) contains pipes including a Rigid Vent-Pipe (10), through which air is transmitted to and from a Storage Tank (103—FIG. 1).

The Shaft Sleeve (136) also houses Latch Chamber Vent Pipes (140), which are open to the atmosphere and allow water to travel back and forth through a Latch Control Chamber (24—FIG. 2) with the rise and fall of each wave. Also housed in the Shaft Sleeve (136) are Surplus Fluid Outlet Pipes (45), which vent surplus fluid from a Storage Tank (103) to the atmosphere above sea level.

Connected to the Shaft (169) is a Float Frame (132), which provides structural support for the Float (9), which can be longer than the width of the Floatation Component (1).

At each end of the Float Frame (132) are the Orientation Blades (133), which are vanes that keep the Float (9) parallel to the wave-front and always remain partly submerged.

FIG. 4

Shown in a cross-section, side-view from the same embodiment of the invention is part of the interior of the Compressor Chamber power take-off mechanism (14) adapted to contain piston O-ring seals. Shown is the Shaft (169), the Piston (13) and the Compressor Chamber Wall (22).

At the upper part of the Piston (13) is a Piston Seal Upper Stop (76) and a Piston Seal Upper Stop O-Ring (77) which together form a barrier to maintain in place a Piston Seal Upper Presser (78) and a Piston Seal Upper Presser O-Ring (79).

The Piston Seal Upper Presser (78) and the Piston Seal Upper Presser O-Ring (79) form a ring around the Piston (13) and can move vertically in relation to the Piston (13).

When under pressure from above, the Piston Seal Upper Presser (78) and the Piston Seal Upper Presser O-Ring (79) will press against a Piston Seal Upper O-Ring (81), causing the Piston Seal Upper O-Ring (81) to form a seal between the Piston (13) and the Compressor Chamber Wall (22).

The Piston Seal Upper O-Ring (81) is held in place by a Piston Seal Housing (82), which is protected from direct contact with the Piston Seal Upper Presser (78) by a Piston Seal Upper Buffer O-Ring (80).

On the lower part of the Piston (13) is a Piston Seal Lower Stop (88) and a Piston Seal Lower Stop O-Ring (87) which together form a barrier to maintain in place a Piston Seal Lower Presser (86) and a Piston Seal Lower Presser O-Ring (85).

The Piston Seal Lower Presser (86) and the Piston Seal Lower Presser O-Ring (85) form a ring around the Piston (13) and can move vertically in relation to the Piston (13).

When under pressure from below, the Piston Seal Lower Presser (86) and the Piston Seal Lower Presser O-Ring (85) press against a Piston Seal Lower O-Ring (83), causing the Piston Seal Lower O-Ring (83) to form a seal between the Piston (13) and the Compressor Chamber Wall (22).

Also housed on the Piston Seal Housing (82) is a Piston Seal Lower Buffer O-Ring (84) which protects the Piston Seal Housing (82) from direct contact with the Piston Seal Lower Presser (86).

FIG. 5

Shown in a cross section, side view from the same embodiment of the invention is the top and bottom of the Compressor Chamber power take-off mechanism (14), but not showing the middle of the Compressor Chamber (14).

Figure 3:
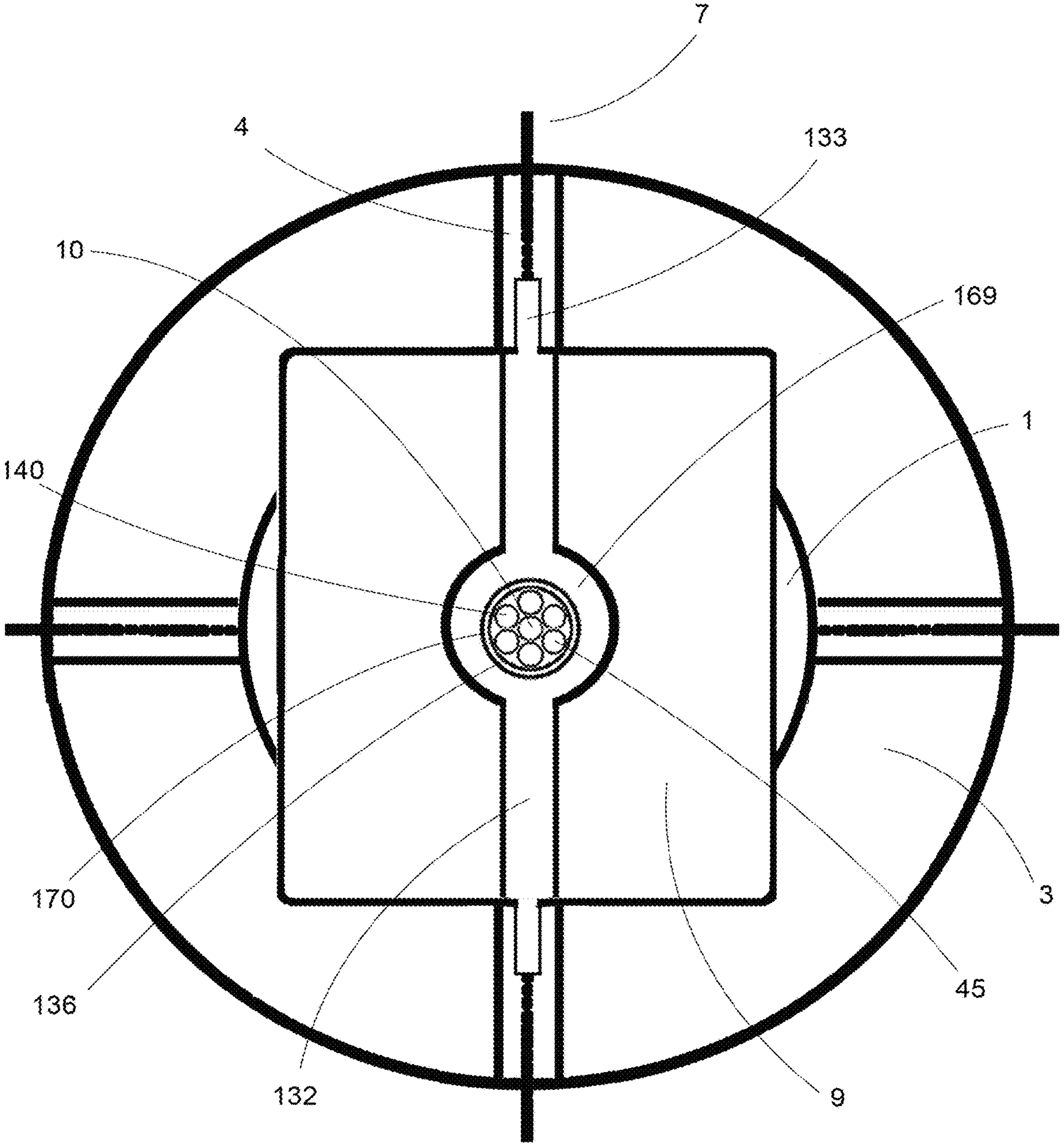
FIG. 3 is an external, top view of the same embodiment of the invention showing the body of the apparatus, the Floatation Component (1), and the upper parts of the buoy of the apparatus, the Buoyant Moving Component (2) viewed from above the Float (9) but below the Seabed Storage Tank Vent Pipe Cowl (67—FIG. 2).

Extending though the full length of the Compressor Chamber (14) is the Shaft (169) and contained within the Shaft (169) is the Shaft Sleeve (136—FIG. 2 & FIG. 3).

Figure 1:
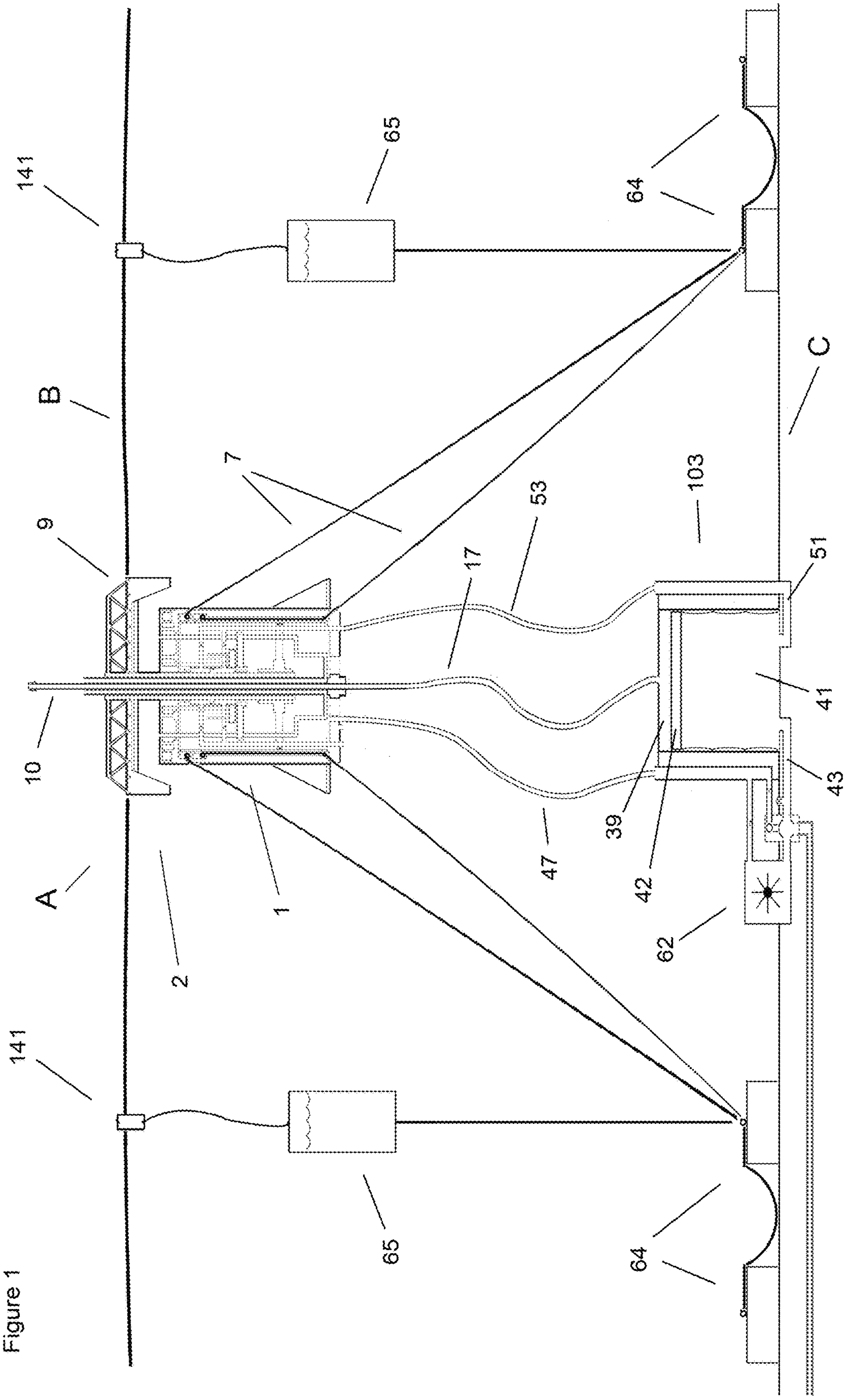
FIG. 1 is a cross-section side-view of one embodiment of the invention showing the apparatus (A) in relation to the Sea Surface (B), and the Seabed (C).

The Shaft Sleeve (136) surrounds fluid ducts including a Rigid Vent-Pipe (10—FIG. 1, FIG. 2 & FIG. 3). Adjacent to the Rigid Vent-Pipe (10) is a Latch Chamber Vent Pipe (140—FIG. 2 & FIG. 3). Shown also is a Surplus Fluid Outlet Pipe (45—FIG. 2 & FIG. 3). These parts extend the full length of the Compressor Chamber (14) and beyond.

At the top and bottom of the Compressor Chamber (14) High-Pressure Release Pipes (12) and the High-Pressure Release Valves (142) release fluid from the Compressor Chamber (14) once pressure reaches a set level.

At the top and bottom of the Compressor Chamber (14) are O-Ring seals (70) which are compressed to form a seal by the O-Ring Seal Presser (71) when pressure inside the Compressor Chamber (14) exceeds pressure outside the Compressor Chamber (14).

At the top of the Compressor Chamber (14) the O-Ring Seals (70) and the O-Ring Seal Presser (71) are housed in an O-Ring Seal Housing (72) and at the bottom of the Compressor Chamber (14) the O-Ring Seals (70) and the O-Ring Seal Presser (71) are housed in an O-Ring Seal Housing (75). All the O-Ring Seal Pressers (71) and the O-Ring Seals (70) are held in place by removable O-Ring Retainers (73).

Also shown is the Compressor Unit Outer Housing (32—FIG. 2) and Latch Sleeve Bearings (131), which facilitate the rotation of the Latch Sleeve (23—FIG. 2).

FIG. 6

Figure 4:
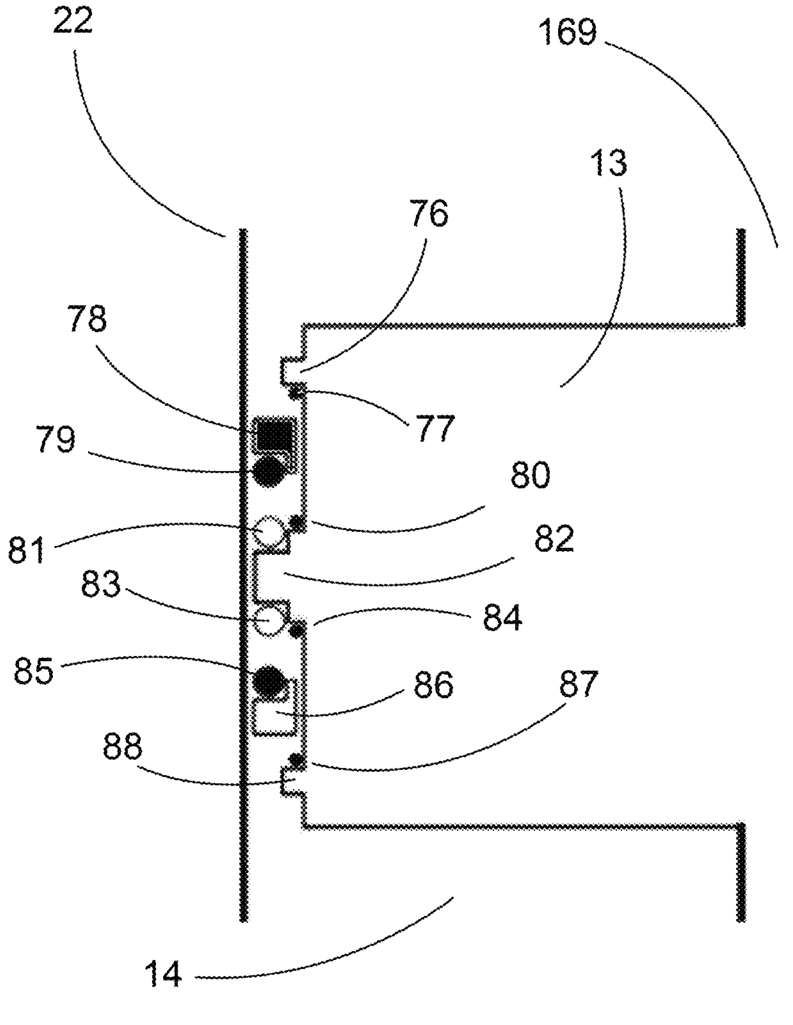
FIG. 4 is a cross-section, side-view of the same embodiment of the invention showing piston seals of the piston of the Buoyant Moving Component (2).

Shown in a cross-section, top view from the same embodiment of the invention adapted to contain latch sleeve aperture seals is the Latch Sleeve (23—FIG. 2 & FIG. 5), the Compressor Unit Outer Housing (32—FIG. 2 & FIG. 5), and the Compressor Chamber Wall (22—FIG. 2 & FIG. 4).

The Compressor Unit Outer Housing (32) surrounds the Latch Sleeve (23), while the Latch Sleeve (23) surrounds the Compressor Chamber Wall (22).

The Compressor Unit Outer Housing Apertures (35) and the Compressor Chamber Apertures (33) are always aligned.

However, the Latch Sleeve (23) is free to rotate to left or to right causing the Latch Sleeve Apertures (34) to not align with the Compressor Unit Outer Housing Apertures (35) and the Compressor Chamber Apertures (33).

Thus, the rotation of the Latch Sleeve (23) prevents fluid moving in and out of the Compressor Chamber (14—FIG. 2) when the Latch Blades (25—FIG. 2) are deflected either to the right or to the left by fluid flowing through the Latch Control Chamber (24—FIG. 2).

The Latch Sleeve (23) allows fluid to enter and exit the Compressor Chamber (14) only when fluid is not flowing through the Latch Control Chamber (24) and the Latch Sleeve Apertures (34) are therefore aligned with the Compressor Unit Outer Housing Apertures (35), and the Compressor Chamber Apertures (33).

An Inner Seal Housing (89) fixed to the inner side of the Latch Sleeve (23) houses an Inner Seal O-Ring (90) and an Inner Seal Plate (91), and loosely connected with the Inner Seal Housing (89) is an Inner Seal Presser (92) that moves in response to pressure variations. Under pressure, the Inner Seal Presser (92) presses the Inner Seal O-Ring (90) and causes the Inner Seal O-Ring (90) to deform and press the Inner Seal Plate (91) against the Compressor Chamber Wall (22), thereby forming a barrier to the movement of fluid. The Inner Seal Presser (92) moves only between the Inner Seal O-Ring (90) and the Inner Seal Presser Stop (93).

A Seal O-Ring Holder Peg (94) is fixed to both the inside and the outside of the Latch Sleeve (23) and holds in place the Inner Seal O-Ring (90). The Seal O-Ring Holder Peg (94) is not fully visible from the angle of this drawing, but the location of the Seal O-Ring Holder Peg (94) is indicated by a dotted line.

An Outer Seal Housing (95) is fixed to the outer side of the Latch Sleeve (23) and houses an Outer Seal O-Ring (96) and an Outer Seal Plate (97). Loosely connected with the Outer Seal Housing (95) is the Outer Seal Presser (98), which moves in response to variations in pressure. When pressure increases the Outer Seal Presser (98) presses against the Outer Seal O-Ring (96) and causes the Outer Seal O-Ring (96) to deform and press the Outer Seal Plate (97) against the Compressor Unit Outer Housing (32) thereby forming a barrier to fluid movement. The Latch Sleeve Outer Seal Presser (98) moves only between the Outer Seal O-Ring (96) and the Outer Seal Presser Stop (99). A Seal O-Ring Holder Peg (94) holds in place the Outer Seal O-Ring (96).

Figure 7:
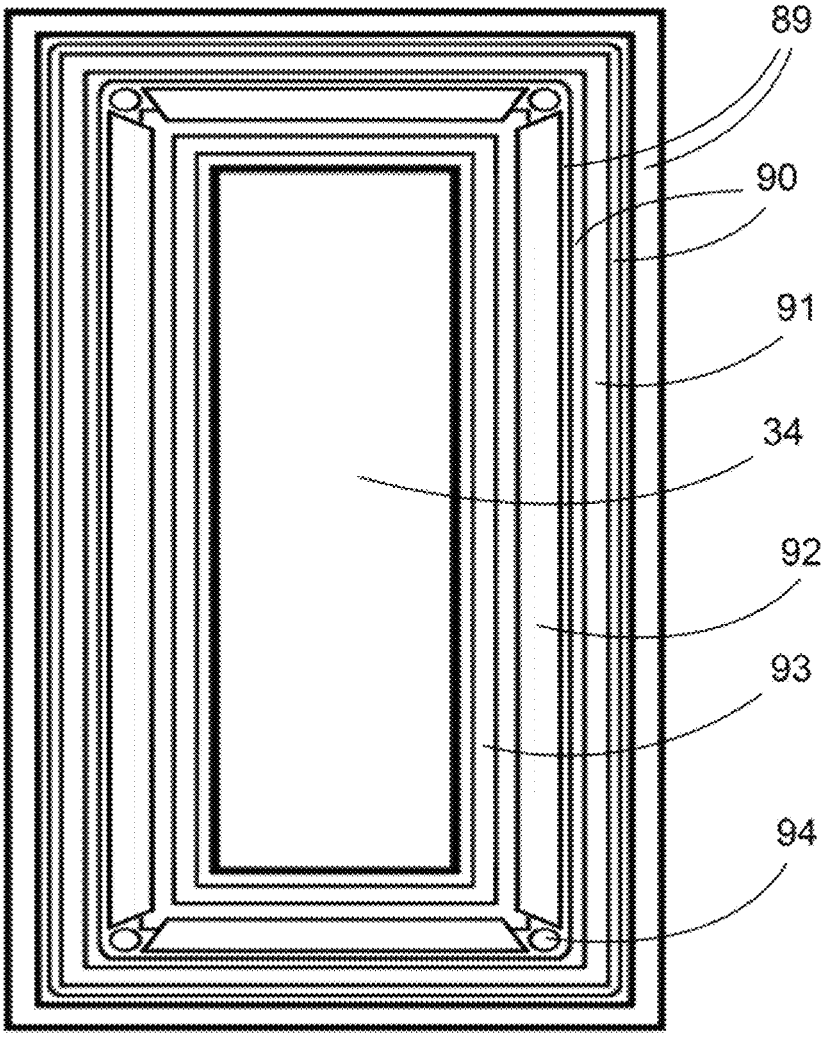
FIG. 7 is a side-view, of the same embodiment of the invention showing Latch Sleeve Aperture Inner Seals from inside the Latch Sleeve (23).
Figure 8:
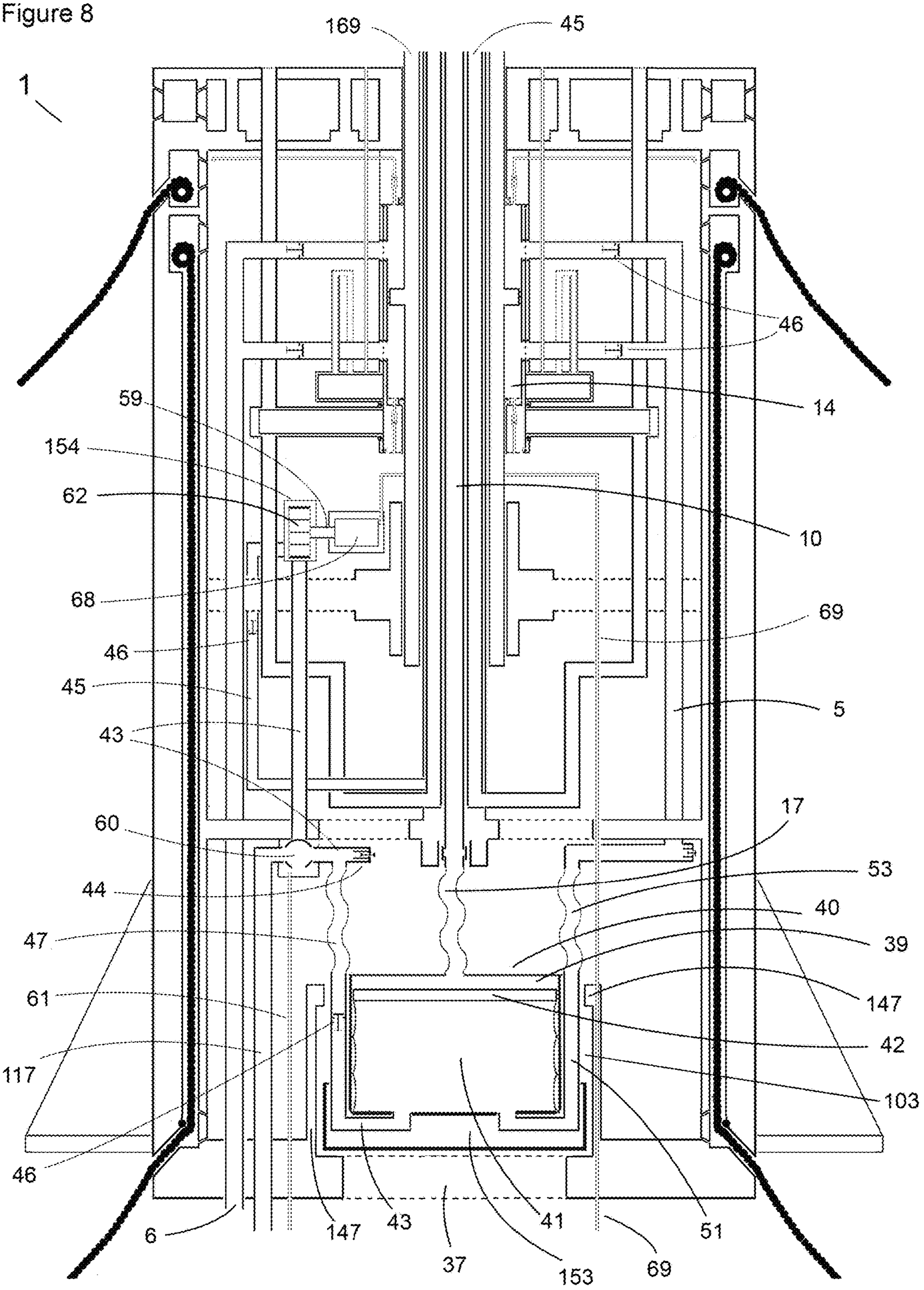
FIG. 8 is a cross-section, side-view of one embodiment of the invention showing the Storage Tank (103), and related components, inside the Floatation Component (1).

The Seal O-Ring Holder Peg (94) is not fully visible from the angle of this drawing but is indicated by a dotted line shown in FIG. 7.

FIG. 7

Shown in a side-view of the inner side of the Latch Sleeve Aperture (34) from the same embodiment of the invention is an Inner Seal Housing (89) that houses the Inner Seal O-Ring (90) and the Inner Seal Plate (91).

Figure 6:
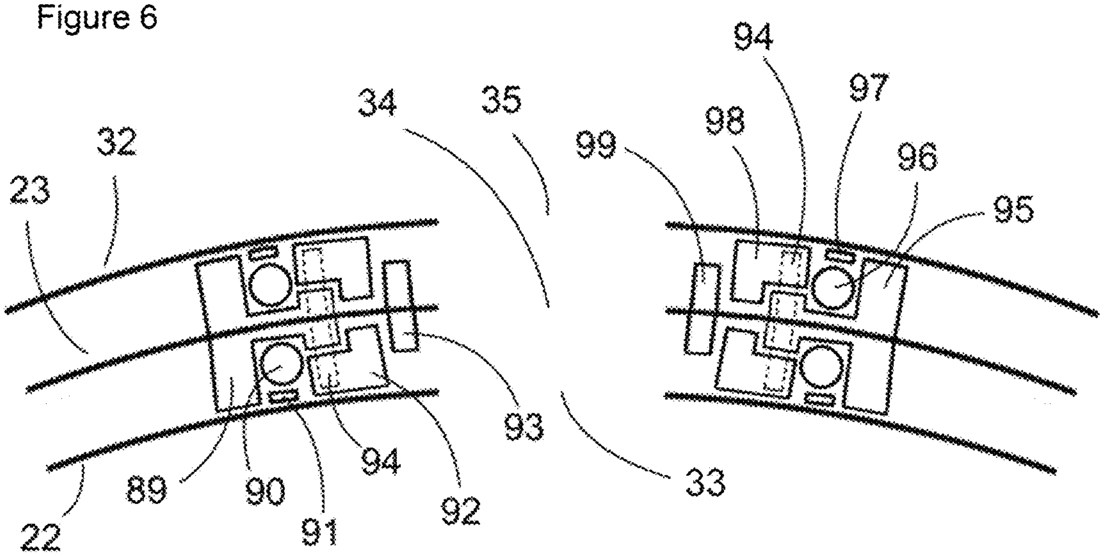
FIG. 6 is a cross-section, top view of the same embodiment of the invention showing Latch Sleeve Aperture Seals.

The Inner Seal Presser (92) moves when pressure causing the Inner Seal O-Ring (90) to press the Inner Seal Plate (91) against the Compressor Chamber Wall (22—FIG. 6 & FIG. 2). The Inner Seal Presser (92) moves only between the Inner Seal O-Ring (90) and the Inner Seal Presser Stop (93).

Also shown are the Seal O-Ring Holder Pegs (94) which hold the Inner Seal O-Ring (90) in place.

FIG. 8

Shown is a cross-section, side-view of one embodiment in which the Floatation Component (1) contains a Storage Tank (103) that supplies fluid to generate electricity.

Above an Access Aperture (37—FIG. 2) is a Storage Tank (103) supported by a Float (153) that maintains the buoyancy of the Storage Tank (103) in water to avoid interference with the buoyancy of the Floatation Component (1). The movement of the Storage Tank (103) is guided by a Storage Tank Float Frame (147).

A Storage Tank Housing (40) contains the inner parts of a Storage Tank (103) which include a Vent Fluid Compartment (39) which contains air from above the sea surface. As the Vent Fluid Compartment (39) contracts or expands, air from the atmosphere vents in or out of the Vent Fluid Compartment (39) via a Flexible Vent-Pipe (17) which is fluidly connected to a Rigid Vent-Pipe (10), which is housed inside the Shaft (169).

The contraction and expansion of a Vent Fluid Compartment (39) is caused by the vertical movement of a Weight (42) on top of an Expandible Container (41) which rises and falls with the enters or exit of fluid.

Fluid drawn into a Floatation Component (1) via a Compressor Chamber Inlet Pipe (6) is pumped out of the Compressor Chamber (14) via a Compressor Chamber Outlet Pipe (5), which is fluidly connected to a Flexible Inlet Pipe (53), which is connected to a Storage Tank Inlet Pipe (51), which supplies the fluid to the Expandible Container (41).

When fluid is free to leave the Expandible Container (41), the gravitational force of the Weight (42) forces the fluid out of the Expandible Container (41) at a steady rate via a Storage Tank Outlet Pipe (43), which contains a One-Way Valve (46).

Fluid being transported via a Storage Tank Outlet Pipe (43) travels through a Flexible Outlet Pipe (47) and then enters another section of the Storage Tank Outlet Pipe (43), which delivers the fluid to a Diverter Valve (60).

A High-Pressure Release Valve (44), located on a Storage Tank Outlet Pipe (43), releases fluid from the Storage Tank Outlet Pipe (43) whenever pressure reaches a set level. The Diverter Valve (60) being controlled remotely via a Communication Pipe (61), which can carry cables, hydraulic pipes, or other communication means.

A Diverter Valve (60) can be set to direct the fluid to a Turbine (62) which is housed in a Turbine Housing (154) and is mechanically connected to a Turbine Drive Shaft (59) that drives an Electrical Generator (68). Electricity generated by the Electrical Generator (68) can be conveyed elsewhere via a Generator Communication Pipe (69).

Downstream fluid that has passed through the Turbine (62) is released into a Surplus Fluid Outlet Pipe (45), which contains One-Way Valves (46), and which removes the fluid from the Floatation Component (1) via the Shaft (169).

The Diverter Valve (60) can also be set to divert the fluid from the Storage Tank Outlet Pipe (43) to an External Delivery Pipe (117) for delivery elsewhere.

FIG. 9

A side-view of one embodiment of the invention shows a Storage Tank (103) that is located on the Seabed (C) together with related components.

Fluid pumped from a Floatation Component (1—FIG. 2) travels via a Flexible Inlet Pipe (53) and a Storage Tank Inlet Pipe (51) into an Expandible Container (41) that supports a Weight (42) and which is housed in a Storage Tank Housing (40). The increasing volume of fluid in the Expandible Container (41) causes the Weight (42) to rise and displace air from a Vent Fluid Compartment (39), the air traveling via a Flexible Vent-Pipe (17), and a Rigid Vent-Pipe (10—FIG. 2) before release into the air via a Vent Pipe Cowl (67—FIG. 2).

When a Diverter Valve (60) is altered to allow fluid to leave the Storage Tank (103) the Weight (42) forces the fluid out of the Expandible Container (41), and as the Weight (42) descends, low pressure draws air from the atmosphere into the Vent Fluid Compartment (39) via the Flexible Vent-Pipe (17), the Rigid Vent-Pipe (10—FIG. 2).

A Diverter Valve (60) can be set to release fluid stored in the Storage Tank (103) into an External Delivery Pipe (117) or to release surplus fluid from the Storage Tank (103) into a Surplus Fluid Outlet Pipe (45), which contains One-Way Valves (46), after which the fluid travels through the Flexible Outlet Pipe (47) for release at surface level.

Surplus fluid stored in the Storage Tank (103) is released through a High-Pressure Release Valve (44) when pressure in the Storage Tank (103) reaches a set level.

FIG. 10

Shown in an external top-down view of one embodiment of the invention is a Storage Tank (103) on the Seabed with related components, including a Storage Tank Housing (40), a Flexible Vent-Pipe (17), and a Storage Tank Inlet Pipe (51). A Weight (42) and an Expandible Container (41) are not visible and are marked as a dotted line.

Also shown is a Storage Tank Outlet Pipe (43), a High-Pressure Release Valve (44), a Surplus Fluid Outlet Pipe (45), One-Way Valves (46), a Diverter Valve (60), a Communication Pipe (61), a Turbine Housing (154), a Turbine (62), a Turbine Drive Shaft (59), an Electrical Generator (68), and a Generator Communication Pipe (69).

Figure 9:
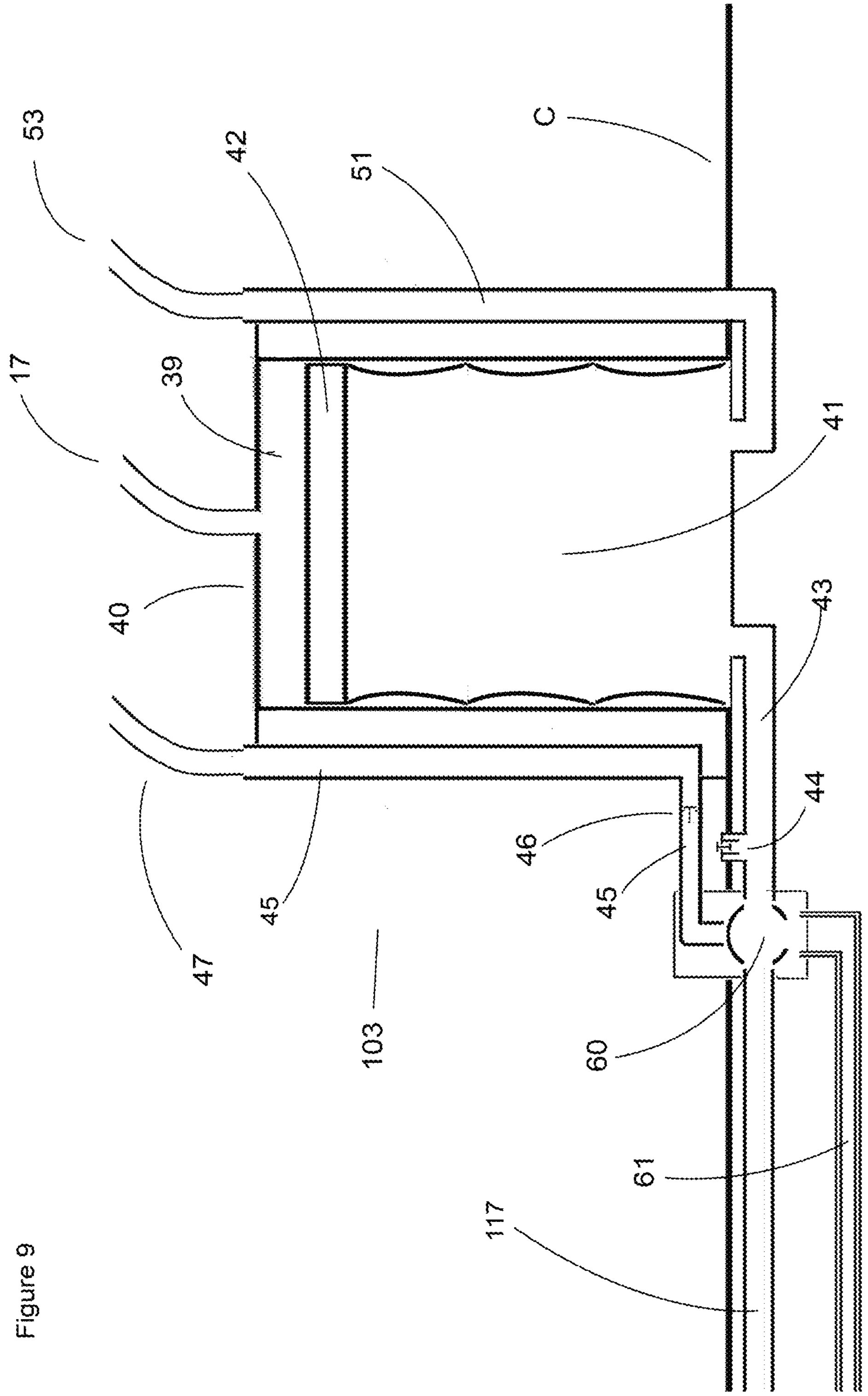
FIG. 9 is a cross-section, side-view of one embodiment of the invention showing the Storage Tank (103) and related components, on the Seabed (C).
Figure 10:
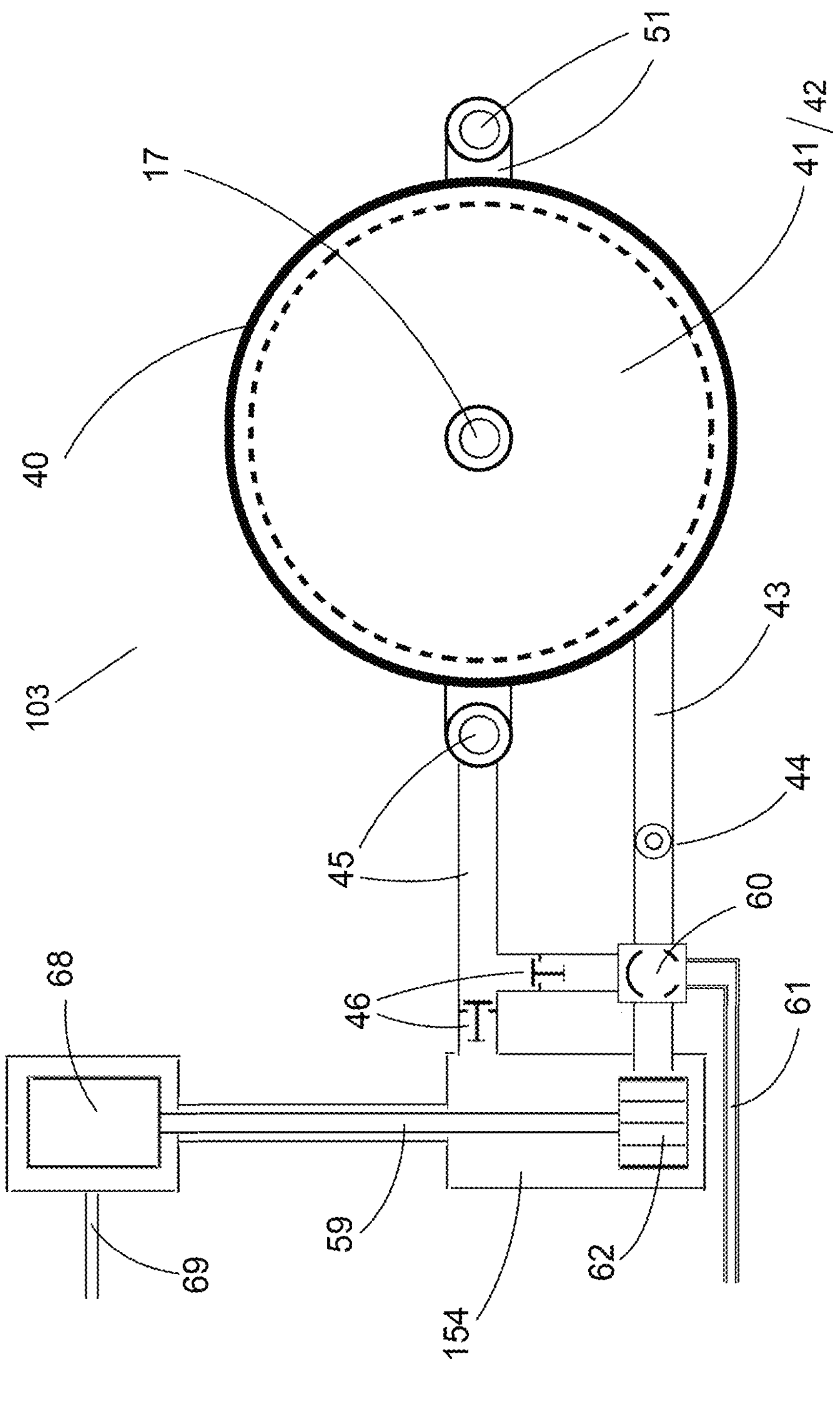
FIG. 10 is an external, top view of one embodiment of the invention showing the Storage Tank (103) on the Seabed (C) with a Turbine (62) and Electrical Generator (68).

The Diverter Valve (60) can release water from the Storage Tank (103) into a Turbine Housing (154) where the water drives the Turbine (62). The downstream water is released to sea surface via a Surplus Outlet Pipe (45) and a Flexible Outlet Pipe (47—FIG. 9).

The Turbine (62) drives a Turbine Drive Shaft (59) that drives a Generator (68), and electrical power is delivered elsewhere via the Generator Communication Pipe (69).

FIG. 11

Shown in an external top view of one embodiment of the invention wherein a Storage Tank (103) on the Seabed for pumping fluids and included is a Storage Tank Housing (40), a Flexible Vent-Pipe (17), a Storage Tank Inlet Pipe (51), an Expandible Container (41) and Weight (42)), (both marked by a dotted line), a Storage Tank Outlet Pipe (43), a High-Pressure Release Valve (44), a Surplus Fluid Outlet Pipe (45), One-Way Valves (46), a Diverter Valve (60), a Communication Pipe (61), a Turbine Housing (154), a Turbine (62), and a Turbine Drive Shaft (59), which drives an Impeller (102), that pumps fluid through a Seabed Pipe (101).

FIG. 12

Shown in a cross-section side-view of one embodiment of the invention adapted for pumping fluid and suspended solids through a Seabed Pipe (101) when the Storage Tank (103—FIG. 11) is located on the seabed. Included is an Impeller (102) in a branch of a Seabed Pipe (101) that forms a loop that is fluidly connected to the Seabed Pipe (101) by a Three-way Outlet Connection (145) that contains a Filter (116) at the point of the connection to the Seabed Pipe (101) and by a three-way Inlet Connection (146) connected to the Seabed Pipe (101) downstream of the Three-way Outlet Connection (145), the Seabed Pipe (101) containing One-Way Valves (46).

FIG. 13

Shown in a side-view cross-section of one embodiment of the invention is a Floatation Component (1) adapted for seawater desalination and included is a Compressor Chamber Inlet Pipe (6) that draws seawater into the Floatation Component (1) due to the motion of the Piston (13) inside the Compressor Chamber (14).

Attached to the Compressor Chamber Inlet Pipe (6) is an Inlet Water Primary Pre-treatment Unit (155) and Inlet Water Secondary Pre-Treatment Units (104). The pre-treated seawater is pumped via the Compressor Chamber (14) into Compressor Chamber Outlet Pipes (5), which contain Concentrated Brine Sumps (107), Concentrated Brine Removal Pipes (108), One-Way Valves (46), Reverse Osmosis Membrane Units (105) and a Post Desalination Treatment Unit (106). The desalinated water is conveyed via Compressor Chamber Outlet Pipes (5), a Flexible Inlet Pipe (53), to a Storage Tank (103—FIG. 1 & FIG. 9) or is directly piped elsewhere.

Air is vented from the Storage Tank (103) via a Flexible Vent-Pipe (17), and surplus fluid can be released to the sea surface via a Flexible Outlet Pipe (47) connected to a Surplus Fluid Outlet Pipe (45).

FIG. 14

Figure 13:
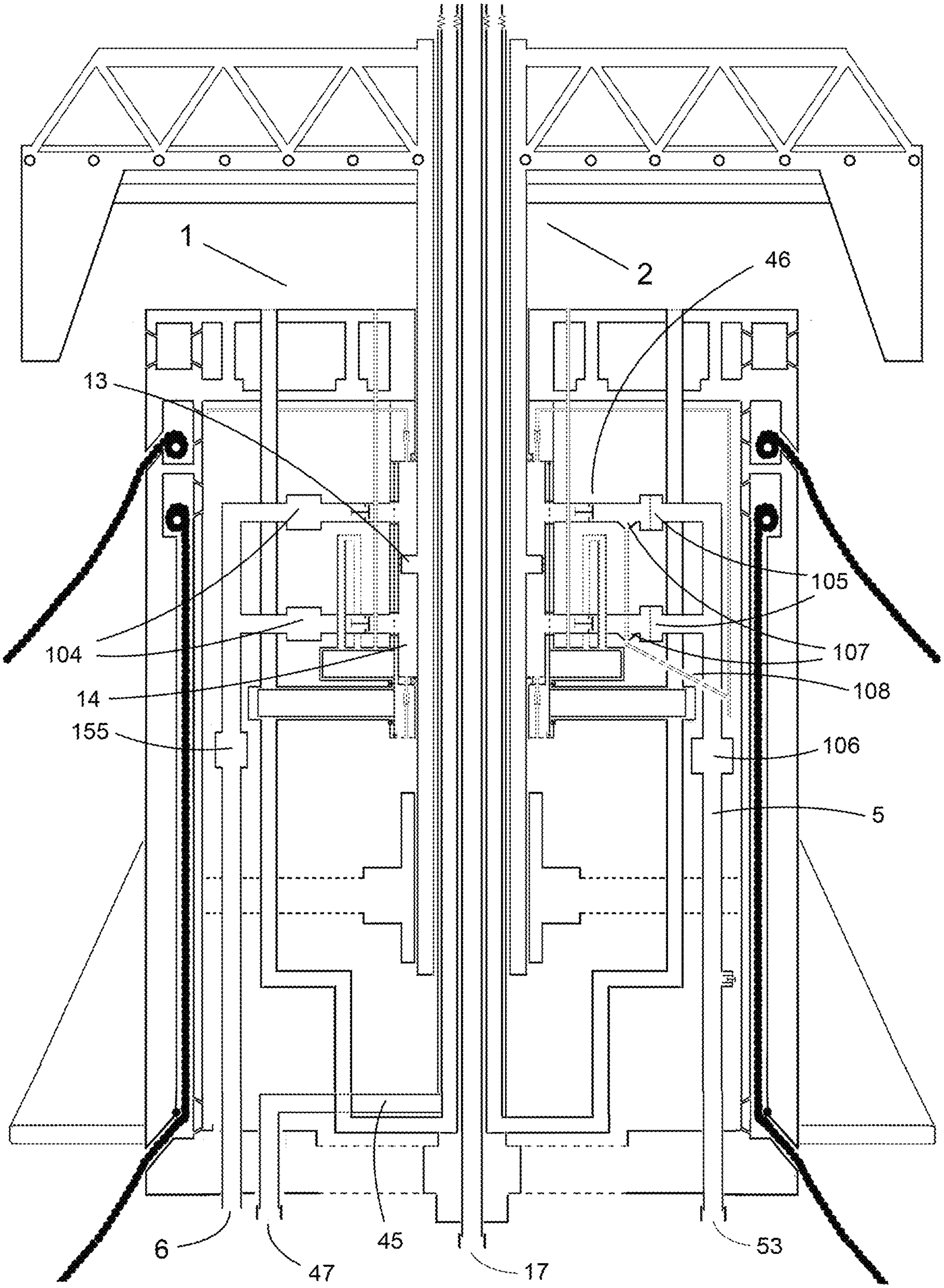
FIG. 13 is a cross-section, side-view of one embodiment of the invention showing the apparatus adapted to produce desalinated water.

Shown in a cross-section side-view of one embodiment of the invention is a Floatation Component (1) adapted for seawater desalination as depicted in FIG. 13 but which has been further adapted for hydrogen gas production.

Turbines (62) in a Compressor Chamber Outlet Pipe (5) are rotated by desalinated water from a Compressor Chamber (14). The upper Turbine (62) drives an Electrical Generator (68) that charges an Electrical Battery (111) while the downstream desalinated water rotates a lower Turbine (62), then enters an Electrolysis Tank (115), or travels via a One-Way Valve (46) and a Flexible Inlet Pipe (53) to a Storage Tank (103—FIG. 9) for storage or direct delivery elsewhere.

The Electrolysis Tank (115) is a circular, ring-shaped tank that surrounds the Rigid Vent-Pipe (10). The entry of the turbine downstream water to the Electrolysis Tank (115) is controlled by Float Valves (118).

On one side of the Electrolysis Tank (115) a Cathode (113) draws Hydrogen from the desalinated water and is powered via an Electrical Cable (112) connected to the Electrical Battery (111). And on the other side of the Electrolysis Tank (115) an Anode (114) draws Oxygen from the desalinated water and is also powered via an Electrical Cable (112) connected to the Electrical Battery (111).

Separating the Cathode (113) and the Anode (114) is a Polymer Electrolyte Membrane (126—FIG. 15) which partitions the electrolysis tank to control the flow of electrons.

From the anode side of the Electrolysis Tank (115) Oxygen is removed by an Impeller (102), which is located within an Oxygen Outlet Pipe (124) and is driven by a Turbine (62), which is located in the Compressor Chamber Inlet Pipe (6).

The Impeller (102) pumps the oxygen through the Oxygen Outlet Pipe (124), which contains a One-Way Valve (46), and out of the Floatation Component (1) via a Flexible Inlet Pipe (53), which delivers the oxygen to a Storage Tank (103—FIG. 9) or elsewhere.

From the cathode side of the Electrolysis Tank (115) hydrogen is removed from the Electrolysis Tank (115) by an Impeller (102) that is powered by the lower Turbine (62) in the Compressor Chamber Outlet Pipe (5). The Impeller (102) pumps the Hydrogen through a Hydrogen Outlet Pipe (119), which contains a One-Way Valve (46), and then via a Flexible Inlet Pipe (53) to a Storage Tank (103) or elsewhere.

Surplus fluid from a Storage Tank (103) is vented to the atmosphere via a Flexible Outlet Pipe (47) and a Surplus Fluid Outlet Pipe (45).

FIG. 15

Figure 14:
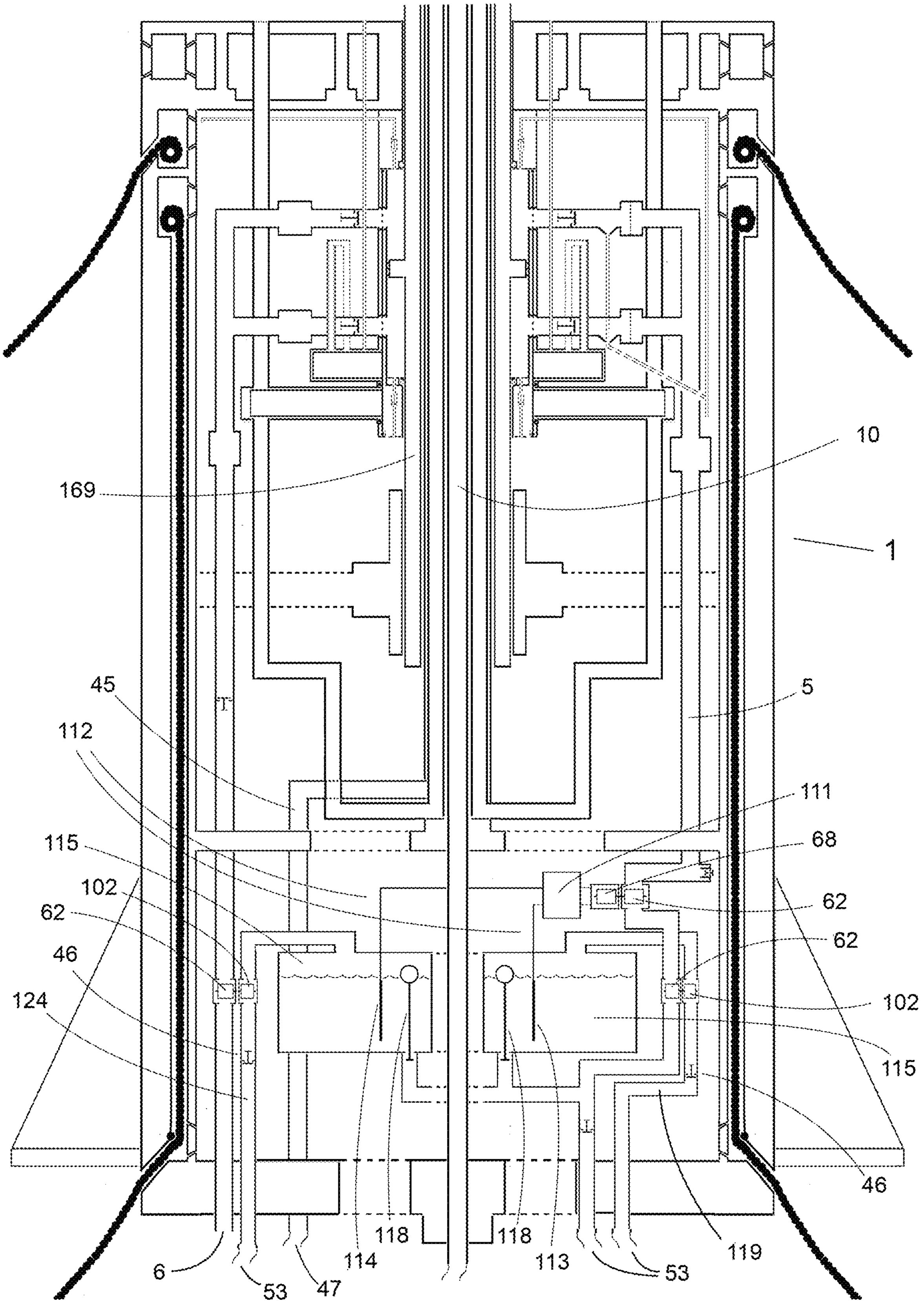
FIG. 14 is a cross-section, side-view of one embodiment of the invention showing the apparatus adapted for hydrogen production.

Shown in a diagrammatic, cross-section, top view of the same embodiment of the invention adapted for hydrogen production as in FIG. 14, is the view from above the roof of an Electrolysis Tank (115) but from below the horizontal sections of the Hydrogen Outlet Pipe (119) and the Oxygen Outlet Pipe (124).

Shown is the Floatation Component Outer Wall (166) and Mooring Connection Channels (167—FIG. 2), Mooring Connections (7), the Hydrogen Outlet Pipe (119), the Compressor Chamber Outlet Pipe (5), the Electrical Cables (112), the Electrolysis Tank (115), the Rigid Vent-Pipe (10), the Compressor Chamber Inlet Pipe (6), the Oxygen Outlet Pipe (124), and Polymer Electrolyte Membrane (126), which partitions the electrolysis tank to control the flow of electrons.

FIG. 16

Shown in a cross-section, side-view of one embodiment of the invention are moorings adapted for deep water operation. The apparatus (A) includes Floatation Components (1), Buoyant Moving Components (2), Storage Tanks (103), the Sea Surface (B) and the Seabed (C), Mooring Connections (7) and Moorings (64).

The Floatation Components (1) are also moored by Mooring Connections (7) to a Floating Mooring Platform (100), which is a submersible buoyant platform open at the base, having apertures through which sea water can move.

The Floating Mooring Platform (100) is fluidly connected to Mooring Float Access Buoys (141), through which fluid can be moved to and from the Floating Mooring Platform (100) to adjust the buoyancy of the Floating Mooring Platform (100).

The Floating Mooring Platform (100) is moored by Mooring Connections (7) to Moorings (64), which are moored to each other in sequence.

The Moorings (64) that are directly connected to the Floating Mooring Platform (100), are also connected to Mooring Floats (65), which have base apertures through which fluid is free to move. Fluidly connected via a hose connection to each Mooring Float (65) is a Mooring Float Access Buoy (141) that is buoyant enough to always remain at the Sea Surface (B) and through which fluid can be moved to and from the Mooring Floats (65), which are shaped to contain enough fluid lighter than water to raise a Mooring (64) off the Seabed (C) to raise the Floating Mooring Platform (100) and Floatation Components (1) to the Sea Surface (B).

The invention claimed is:

1. A wave energy converter, comprising:

a sub-surface body;

a buoy that is disposed above the body and is reciprocally movable along an upright axis relative to the body in response to wave action;

a latch mechanism that is operable to latch the buoy against movement relative to the body; and a shaft that extends downwardly from the buoy into a compressor chamber within the body and is movable with the buoy along the upright axis to drive reciprocal motion of a piston within the compressor chamber, that motion drawing water into the compressor chamber through at least one inlet and pumping water out of the compressor chamber through at least one outlet for industrial uses;

wherein the improvement is characterised by the shaft that is hollow, defining a channel that extends along the shaft from the buoy through the compressor chamber, that channel having open upper and lower ends and containing one or more ducts, at least one of those ducts being in fluid communication with at least one component of the wave energy converter and venting to atmosphere above the buoy.

2. The wave energy converter of claim 1, wherein at least one of the ducts is in fluid communication with the latch mechanism, the latch mechanism being one of said components.

3. The wave energy converter of claim 1, further comprising a storage tank into which fluid can be pumped from the compressor chamber by reciprocal motion of the piston to store fluid for energy and other industrial uses.

4. The wave energy converter of claim 3, wherein at least one of the ducts is in fluid communication with the storage tank, the storage tank being one of said components.

5. The wave energy converter of claim 1, wherein the buoy is rotatable relative to the body about the upright axis.

6. The wave energy converter of claim 5, wherein the buoy is rotatable with the shaft relative to the body.

7. The wave energy converter of claim 6, wherein the buoy comprises vanes for orienting the buoy relative to a wave front.

8. The wave energy converter claim 1, wherein the shaft is movable relative to the or each duct.

9. The wave energy converter of claim 8, wherein the shaft is rotatable relative to the or each duct about the upright axis.

10. The wave energy converter of claim 9, wherein the shaft is movable longitudinally relative to the or each duct in directions parallel to the upright axis.

11. The wave energy converter of claim 1, wherein at least part of the buoy is wider than the body in a horizontal direction.

12. The wave energy converter of claim 11, wherein the buoy is elongate in plan view.

13. The wave energy converter of claim 1, wherein the latch mechanism comprises a barrier that is movable relative to the compressor chamber and has apertures corresponding to apertures in a wall of the compressor chamber, whereby movement of the barrier relative to the compressor chamber enables or blocks fluid communication between the compressor chamber and the or each inlet and outlet when the apertures of the barrier are, respectively, aligned with or out of alignment with the apertures in the wall.

14. The wave energy converter of claim 13, wherein the barrier is a sleeve surrounding and rotatable about the upright axis relative to the compressor chamber, whereby rotation of the sleeve around the compressor chamber brings the apertures of the sleeve into or out of alignment with the apertures in the wall.

15. The wave energy converter of claim 13, wherein the latch mechanism comprises latch control blades that extend outwardly from the sleeve into a latch control chamber in fluid communication with water around the body such that a flow of water through the latch control chamber driven by variations in water pressure acting on the body impinges on the latch control blades to turn the sleeve around the compressor chamber, moving the apertures of the sleeve out of alignment with the apertures in the wall of the compressor chamber to block movement of the piston relative to the compressor chamber by trapping water in the compressor chamber.

16. The wave energy converter of claim 1, wherein the latch mechanism is operable in response to flow or pressure variation of water.

17. The wave energy converter of claim 16, wherein the latch mechanism is operable in response to flow or pressure variation of water in the latch control chamber in the body that is in fluid communication with water surrounding the body and with at least one of the ducts that vent to atmosphere above the buoy.

18. The wave energy converter of claim 1, further comprising a latch release mechanism acting on the latch mechanism, the latch release mechanism being operable to unlatch the buoy to permit movement of the buoy relative to the body.

19. The wave energy converter of claim 18, wherein the latch release mechanism is operable in response to flow or pressure variation of water in an adjuster chamber in the body.

20. The wave energy converter of claim 19, wherein the latch release mechanism comprises adjuster blades that extend outwardly from the sleeve into the adjuster chamber such that a flow of water through the adjuster chamber driven by unequal water distribution in the adjuster chamber impinges on the adjuster blades to apply a restoring force that turns the sleeve around the compressor chamber, moving the apertures of the sleeve into alignment with the apertures in the wall of the compressor chamber to enable the piston to move relative to the compressor chamber by allowing water to enter and exit the compressor chamber.

* * * * *